United States Patent [19]

Louth

[11] Patent Number: 4,544,967
[45] Date of Patent: Oct. 1, 1985

[54] AUTOMATIC SCAN TRACKING SERVO SYSTEM

[75] Inventor: Kenneth Louth, Los Altos, Calif.

[73] Assignee: Ampex Corporation, Redwood City, Calif.

[21] Appl. No.: 364,961

[22] Filed: Apr. 2, 1982

[51] Int. Cl.$^4$ ............................................. G11B 5/56
[52] U.S. Cl. ...................................... 360/77; 360/10.2
[58] Field of Search ....................... 360/10.2, 10.3, 70, 360/77, 78

[56] References Cited

U.S. PATENT DOCUMENTS

| | | | |
|---|---|---|---|
| 4,229,773 | 10/1980 | Sakamoto | 360/70 |
| 4,249,220 | 2/1981 | Yasutake et al. | 360/73 |
| 4,255,768 | 3/1981 | Kubota | 360/10 |
| 4,286,318 | 8/1981 | Immink et al. | 364/118 |
| 4,287,538 | 9/1981 | Sakamoto et al. | 360/10 |
| 4,402,022 | 8/1983 | Hirota et al. | 360/77 |
| 4,426,665 | 1/1984 | Bradford et al. | 360/10.2 |
| 4,451,860 | 5/1984 | Honjo et al. | 360/77 |

FOREIGN PATENT DOCUMENTS 0037738 10/1981 European Pat. Off.
2071879 9/1981 United Kingdom.

OTHER PUBLICATIONS

International Broadcast Engineer, vol. 12, Mar. 1981, The TR-800 VTR, A Computer-Based Total System Design, L. Hedlund.

Primary Examiner—George G. Stellar
Attorney, Agent, or Firm—Bradley A. Perkins; Ralph L. Mossino; Joel D. Talcott

[57] ABSTRACT

An improved automatic scan tracking servo for use in a magnetic recording and reproducing apparatus is disclosed. The automatic scan tracking servo operates generally in the digital domain. The apparatus has a movable element which is transversely moved relative to the longitudinal direction of a recorded track so that the transducing head can be made to accurately follow the track during special motion reproducing modes. The RF video signal is sampled a predetermined number of times during each rotation of the scanning drum carrying the transducing head. The phase of the oscillatory motion or dither that is applied to the movable element carrying the head, the operation of a synchronous detector and the sampling are all totally synchronized to obtain an accurate error signal so that an accurate error correcting signal can be generated to have the transducing head accurately follow a track during such reproducing. The servo utilizes the longitudinal tape speed to provide a predicted value of the slope of the ramp that is required to have the head follow the track and the error correcting signal merely modifies the ramp in accordance with the actual error that is detected. The combination of the synchronism and the predicted value of the slope enables a reduced dither amplitude to be used to obtain an accurate error signal.

26 Claims, 21 Drawing Figures

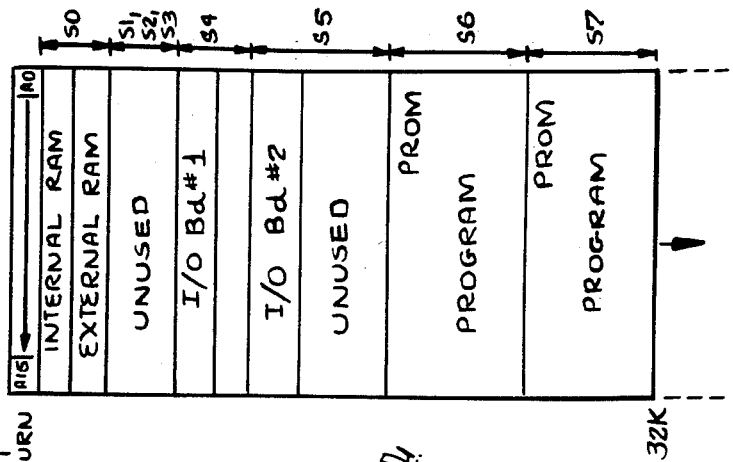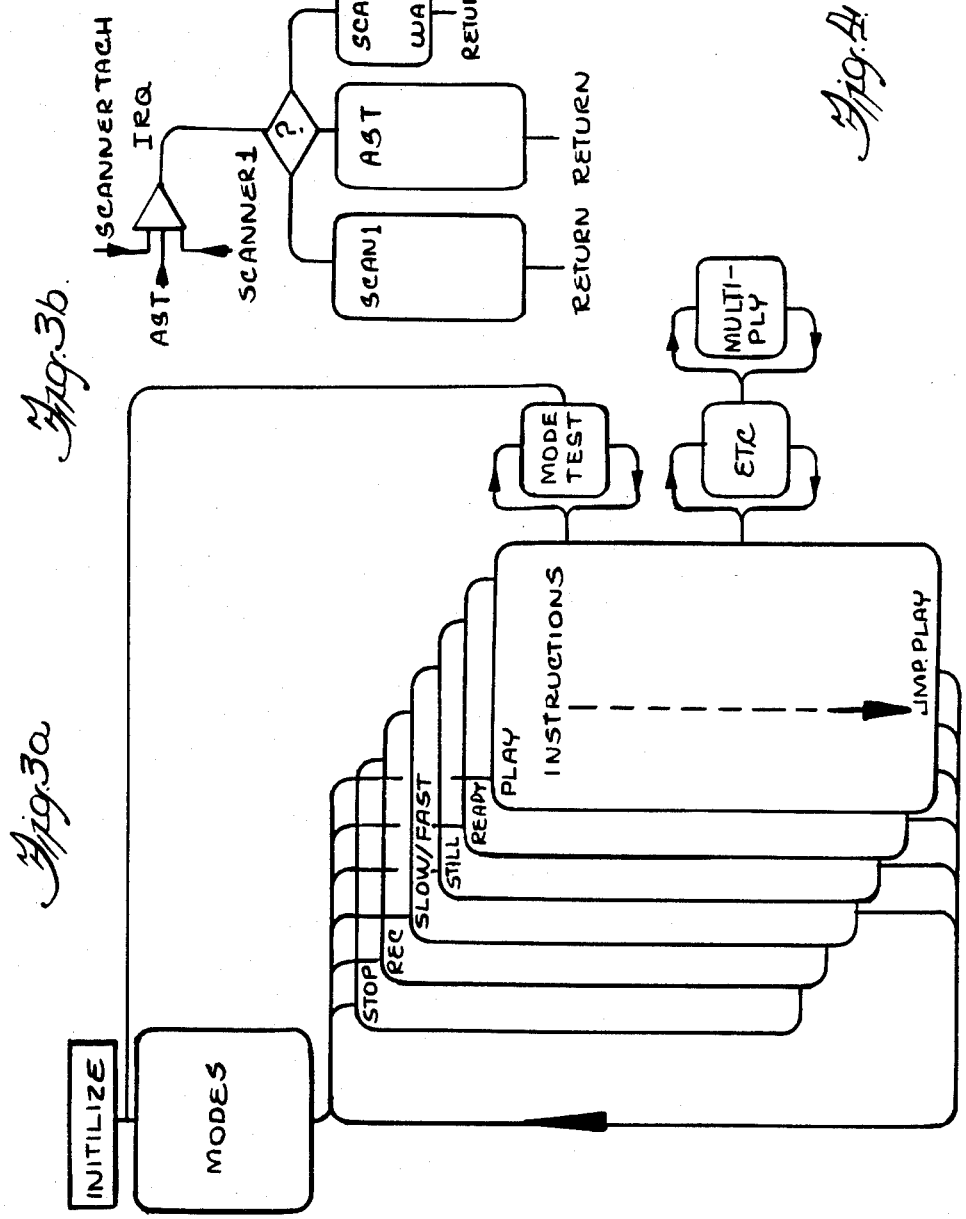

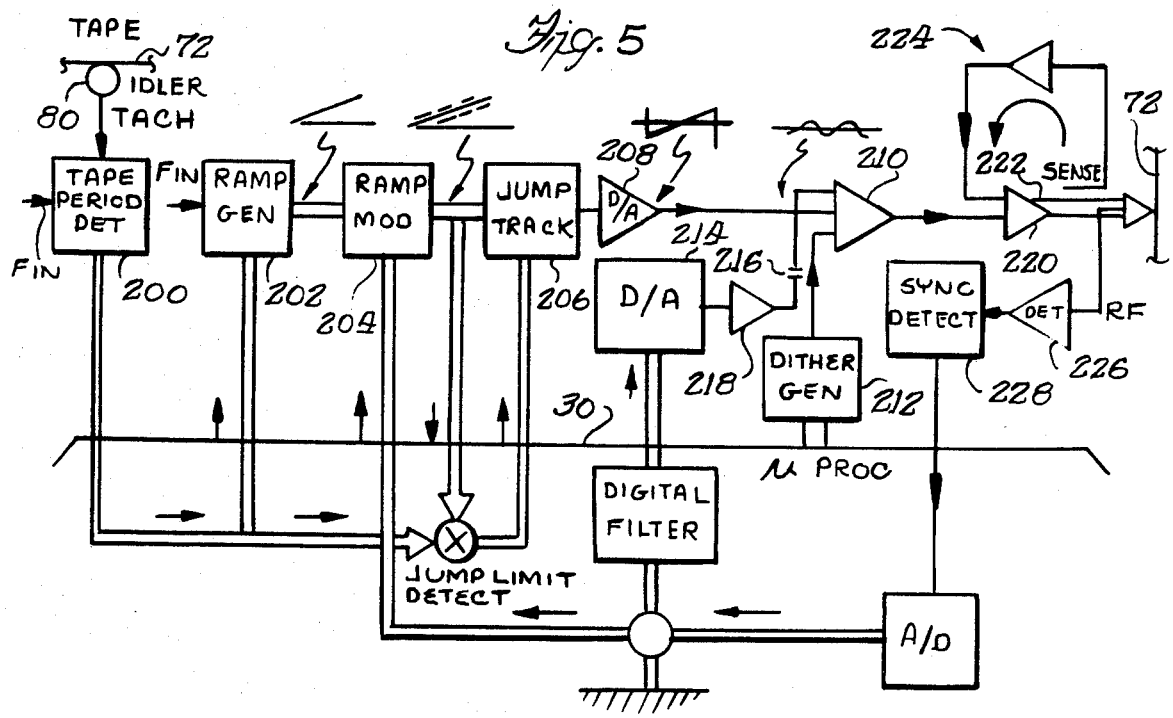
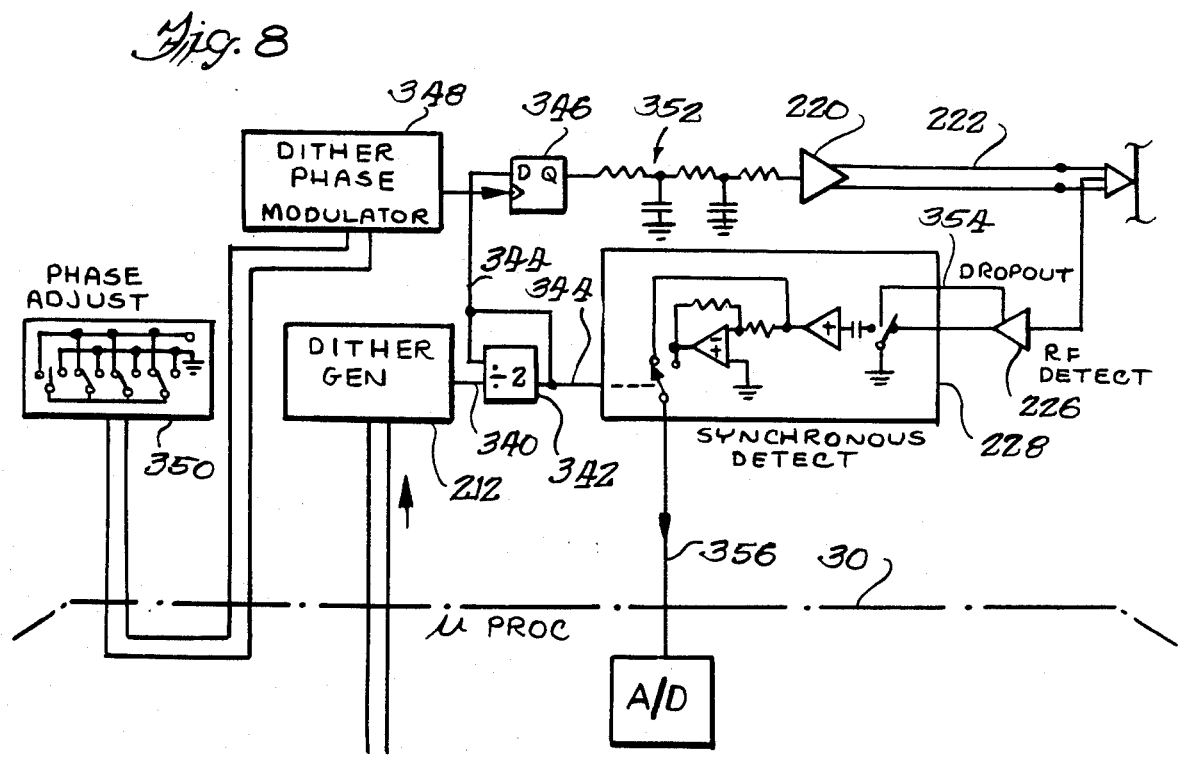

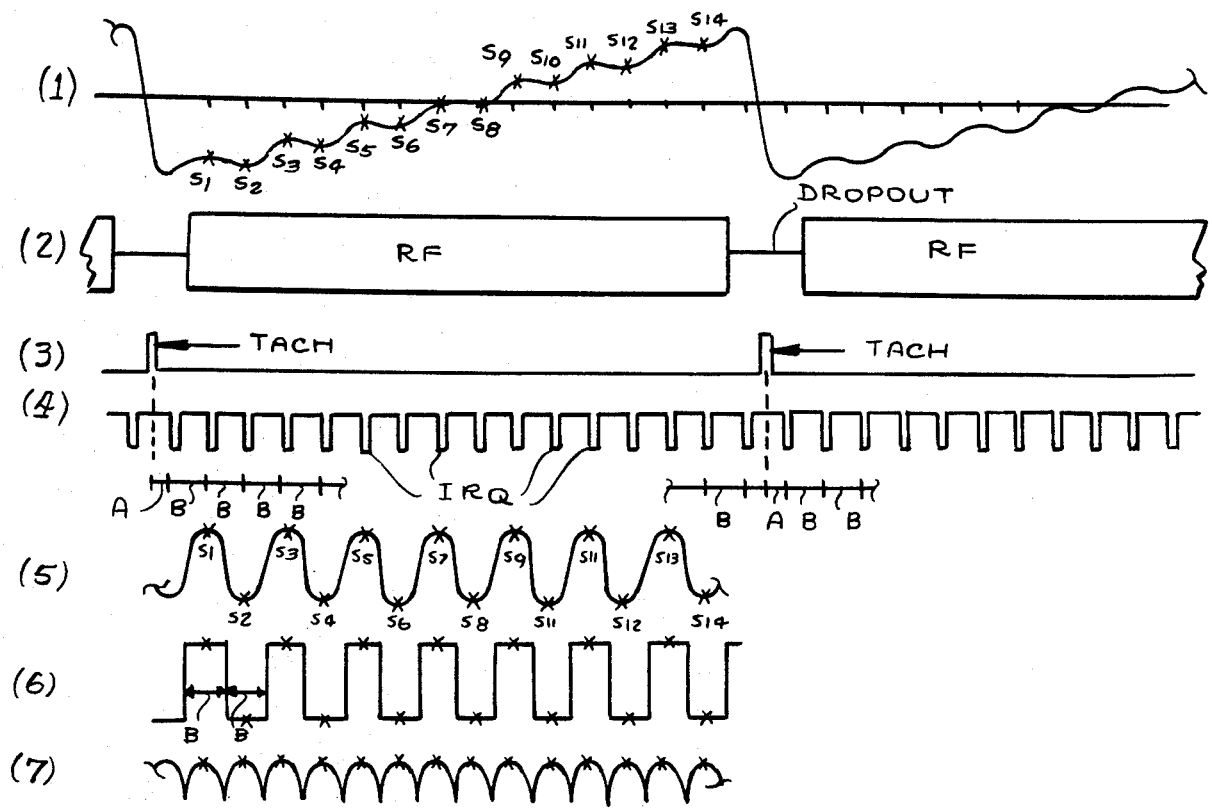
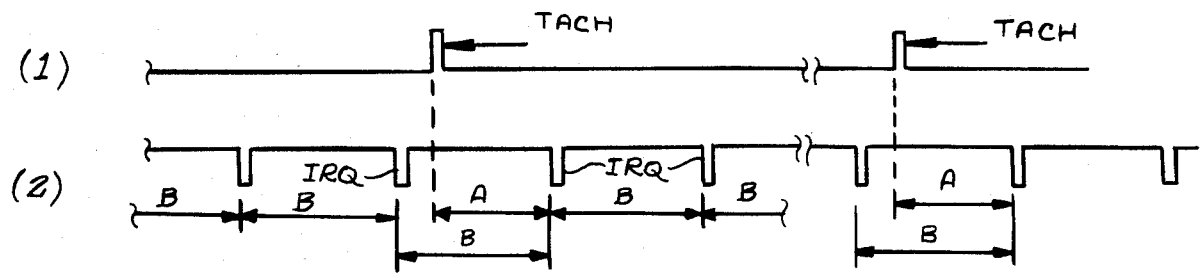

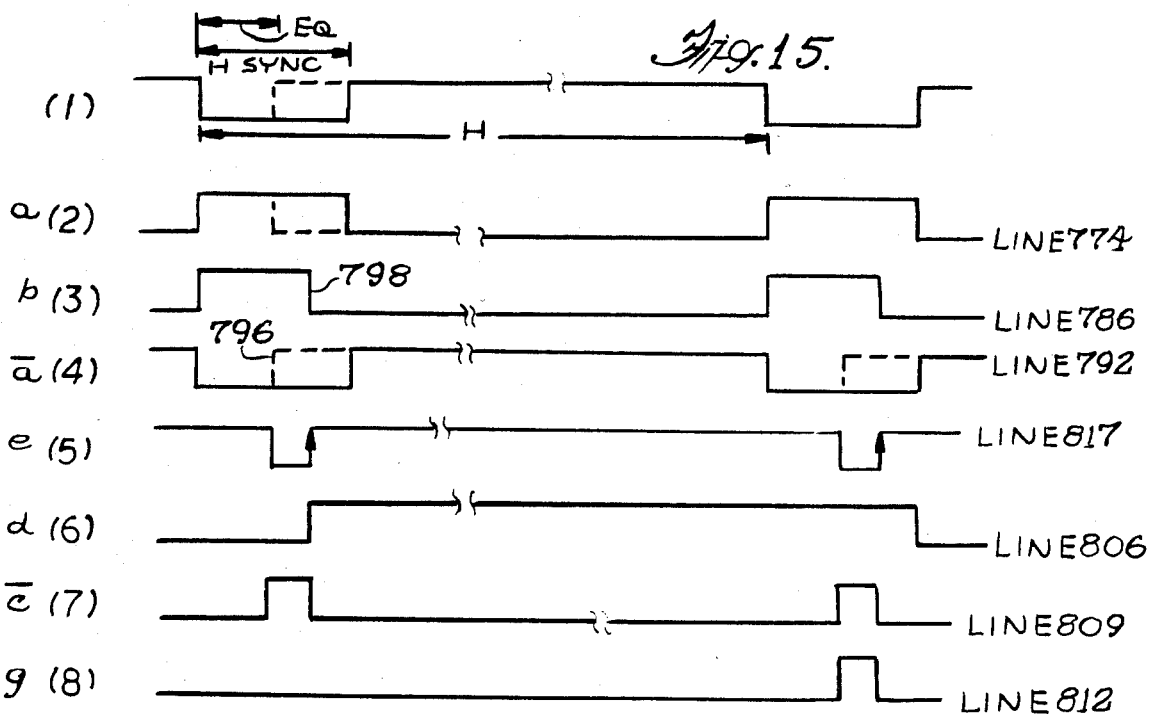
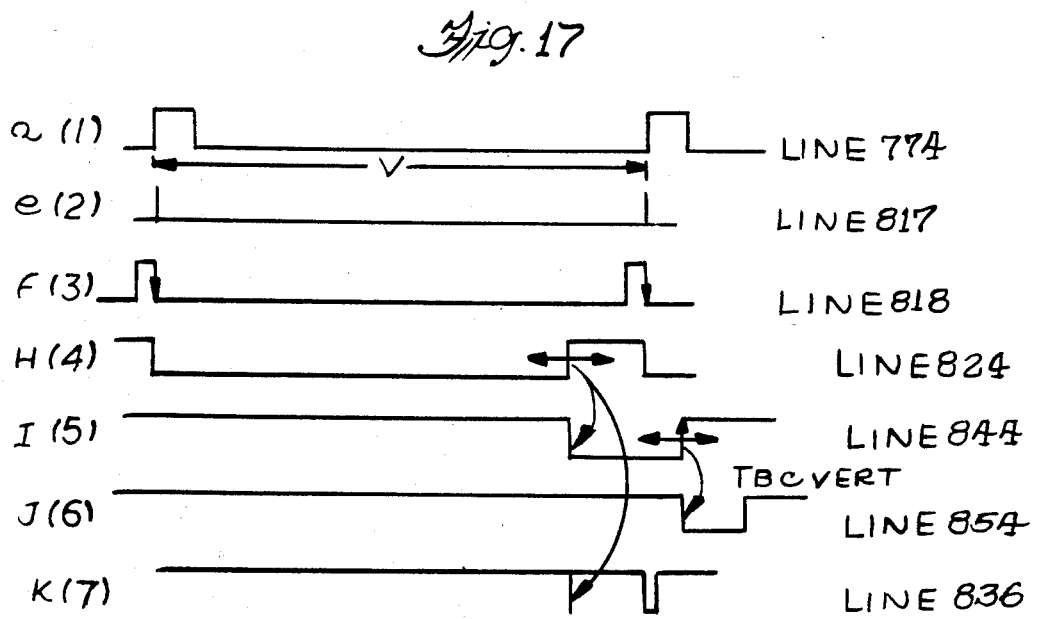

AUTOMATIC SCAN TRACKING SERVO SYSTEM

CROSS REFERENCE TO RELATED APPLICATIONS

MICROPROCESSOR CONTROLLED MULTIPLE SERVO SYSTEM FOR A RECORDING AND/OR REPRODUCING APPARATUS, Ser. No. 364,725, filed Apr. 2, 1982, by Kenneth Louth.

MICROPROCESSOR CONTROLLED REPRODUCING APPARATUS HAVING ASYNCHRONOUS REPRODUCING CAPABILITY, No. 660,453, filed Oct. 2, 1984 which is a continuation of Ser. No. 364,793, filed Apr. 2, 1982, by Kenneth Louth, now abandoned.

PHASE DETECTOR CONTROL FOR A SERVO SYSTEM, Ser. No. 608,268 filed May 7, 1984, which is a continuation of Ser. No. 364,964, filed Apr. 2, 1982, by Kenneth Louth, now abandoned.

AN IMPROVED HEAD REEL SERVO SYSTEM IN A RECORDING AND/OR REPRODUCING APPARATUS, Ser. No. 364,352, filed Apr. 2, 1982, by Kenneth Louth.

A PROGRAMMABLE NONLINEAR SPEED CONTROL FOR A RECORDING AND/OR REPRODUCING APPARATUS, Ser. No. 364,962, filed Apr. 2, 1982, by Kenneth Louth.

AN IMPROVED SCANNING SERVO SYSTEM IN A RECORDING AND/OR REPRODUCING APPARATUS, Ser. No. 364,963, filed Apr. 2, 1982, by Kenneth Louth.

The present invention generally relates to servo systems for recording and reproducing apparatus and, more particularly, to a microprocessor controlled automatic scan tracking servo for a magnetic tape recording and reproducing apparatus.

It is readily appreciated that video recording and reproducing apparatus, particularly, apparatus that records and reproduces video information of broadcast quality, is highly technical and complex equipment that requires sophisticated electronic as well as mechanical components and systems. For broadcast quality recording and reproducing apparatus, particularly video tape recording and reproducing apparatus, the level of technical sophistication is extraordinary in terms of the amount of control that is required to reliably operate the apparatus at broadcast quality standards. Such videotape recording apparatus have a number of servo systems which control their operation, including a servo system for controlling the rotation of the rotatable member recording and reproducing transducers or heads, the servo system which controls the reel drive motors which drive the supply and take-up reels and the capstan servo system which controls the speed with which the tape is driven during recording and reproducing.

Relatively recent developments in recording and reproducing apparatus include a servo system which controls a movable element carrying the reproducing head (or heads) on the scanning drum which movable element is controlled to have the reproducing head follow a track during reproducing thereof so as to permit broadcast quality reproducing during special motion effects, i.e., when the tape is being moved at a speed other than the speed with which it was moved during recording. The movable element moves the head in a direction that is transverse relative to the longitudinal direction of the track to enable it to accurately follow a recorded track and produce a quality signal regardless of whether the tape is being moved at a speed faster than normal record speed which results in a fast motion effect, or if it is moved at a slower than normal speed which results in a slow motion or even stop motion (still frame) effects. The considerations involved in such special motion reproducing effects are comprehensively set forth in the Hathaway et al. No. 576,623 filed Feb. 3, 1984, which is a continuation of Ser. No. 677,815, filed Apr. 16, 1977, now abandoned, which is a continuation of Ser. No. 668,652, filed Mar. 19, 1976, now abandoned.

The prior art automatic scan tracking servo that is employed in the Ampex Model VPR-2 video tape recording and reproducing apparatus operates exclusively in the analog domain with respect to the application of a sinusoidal transverse or dither movement applied to the movable element to create a deliberate error signal that can be used to generate an error correcting signal so that the transducing head will accurately follow the track during reproducing in special motion effect modes. While the analog circuitry is effective in its operation, the degree or amount of dither that is required to be imposed upon the movable element is at a level that exceeds that which is desired, because it detrimentally affects the signal-to-noise ratio in the resulting reproduced video signal.

Accordingly, it is an object of the present invention to provide an improved automatic scan tracking servo which generally operates in the digital domain, which digital processing results in more reliable and accurate operation of the servo.

Another object of the present invention is to provide an improved automatic scan tracking servo of the foregoing type, which by virtue of its operation being generally in the digital domain, enables a lower amplitude dither signal to be applied to the movable element without sacrificing any accuracy in the operation of the servo.

Yet another object of the present invention is to provide an improved automatic scan tracking servo which utilizes tape speed information to predict the slope of the ramp that may be required to accurately follow a track during special motion reproducing, with the amount of work being required by the error correction circuitry being thereby significantly reduced, because the latter only needs to modify the slope of the ramp to have the transducing head accurately follow the track during special motion reproducing.

Another object of the present invention is to provide an improved automatic scan tracking servo of the foregoing type, which by virtue of its being controlled by a microprocessor, permits digital sampling of the RP envelope containing the error at precise locations along the active video portion thereof and wherein the sampling can be fully synchronized with respect to the phase of the dither that is applied to the movable element which produces the error.

Still another object lies in the provision of synchronizing the synchronous detector with the phase of the dither and such sampling locations.

Another object of the present invention lies in the provision for correcting high rate geometric errors using digital filtering and integration techniques to accurately follow a track during special motion reproducing.

A more detailed object lies in the provision of retiming the sampling locations with every rotation of the scanning drum to thereby insure that the sampling occurs at the proper locations and that the synchronization of the phase of the applied dither, the operation of the synchronous detector and the phase of the samples is maintained at all times.

Other objects and advantages will become apparent upon reading the following detailed description, while referring to the attached drawings.

DESCRIPTION OF THE DRAWINGS

FIGS. 3a and 3b are very broad flow charts illustrating the software functional operation of the microprocessor;

FIG. 4 is a map illustrating the manner in which the software instructions are located within the associated microprocessor memories;

FIG. 5 is a functional block diagram of the automatic scan tracking servo system of the present invention;

FIG. 6 illustrates timing diagrams which are useful in describing the operation of the automatic scan tracking servo of the present invention;

FIG. 7 illustrates timing diagrams which are also useful in describing the operation of the automatic scan tracking servo system embodying the present invention;

FIG. 8 is a functional block diagram illustrating the operation of the automatic scan tracking servo system synchronous detector embodying the present invention;

FIG. 9 is a functional block diagram illustrating the automatic scan tracking servo system embodying the present invention and particularly illustrating the error correcting portion of the automatic scan tracking servo system shown in FIG. 5;

FIG. 15 illustrates timing diagrams which are useful in understanding the operation of the tape sync processor shown in FIG. 12;

FIG. 17 illustrates timing diagrams which are useful in understanding the operation of the time base corrector interface circuitry shown in FIGS. 14a and 14b.

DESCRIPTION OF THE APPARATUS

Broadly stated, the automatic scan tracking servo of the present invention includes a microprocessor which also effectively controls all major servos of the tape recording and/or reproducing apparatus, which include: (1) a scanning head servo which rotates the recording and reproducing head at the proper speed during operations; (2) a capstan servo which controls the movement of the tape during recording and during most, but not all, reproducing operations; (3) the reel servo which controls the tensioning and movement of the tape during recording and reproducing operations; and (4) the automatic scan tracking servo of the present invention which controls the transverse movement of the reproduce head relative to the longitudinal direction of the track to have the head accurately follow a track during reproducing, and particularly during special motion effect reproducing wherein the tape is being transported at a speed other than normal playback speed. The microprocessor receives digital information as well as digitally converted analog information from various locations throughout the circuitry and apparatus, processes such information and thereafter provides digital output signals to other circuitry, some signals of which are converted into the analog domain for controlling the various operations that are performed by the apparatus in its various modes.

The automatic scan tracking servo of the present invention will be specifically described herein in conjunction with various block diagrams and specific electrical schematic circuit diagrams, and the other of the major servos will not be described herein. However, such other servos are comprehensively described in the cross referenced application entitled "Microprocessor Controlled Multiple Servo System for a Recording and/or Reproducing Apparatus", Ser. No. 364,725, filed on even date herewith and assigned to the same assignee as the present invention. The specification and drawings of such application are specifically incorporated by reference herein.

Figure 1:
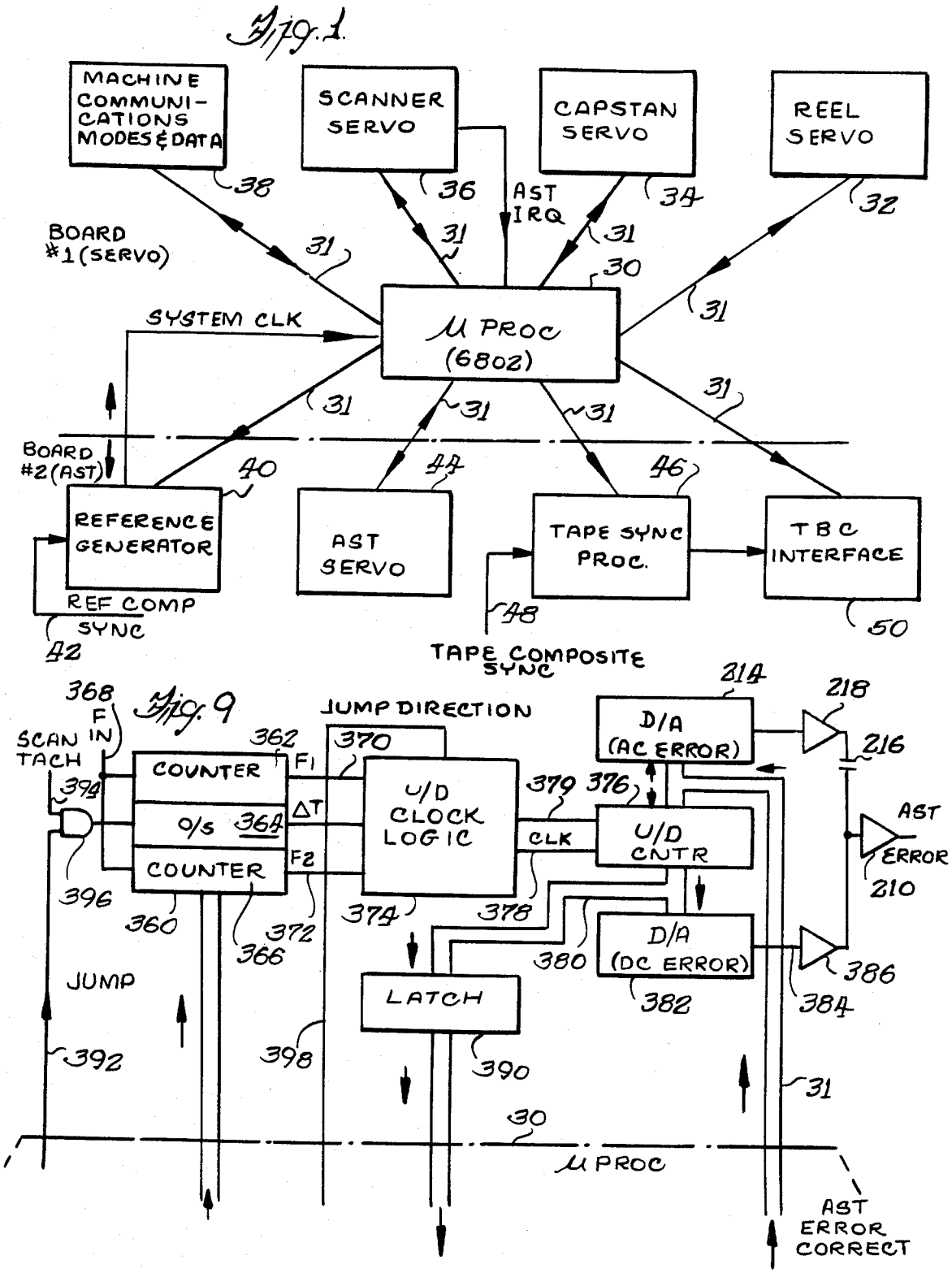
FIG. 1 is a functional block diagram illustrating the functional interaction of the microprocessor with the various servo systems of the apparatus, and of the microprocessor and other important circuitry.

Turning initially to the block diagram of FIG. 1, there is shown a microprocessor 30 which is interconnected by a data bus 31 with a real servo 32, a capstan servo 34, a head scanner servo 36 and a machine communication interface and data 38 which essentially controls the various operating modes of the recording and reproducing apparatus as manipulated by an operator either directly or from a remote location. The microprocessor also interacts with a reference generator 40 which receives as an input thereto a reference station composite sync signal via line 42 and the reference generator generates system clocks that control the microprocessor, which in turn synchronizes all of the clock timing of the servos and other circuitry. The microprocessor also interacts with the automatic scan tracking servo 44 and a tape sync processor 46 which has a tape composite sync signal input via line 48. The tape sync processor additionally provides a signal to the time base corrector interface 50 which provides appropriate timing and control signals for use by the time base corrector to provide a broadcast quality video image having the requisite stability and vertical display position with respect to system reference as well as the correct chroma information, which processing varies depending upon what reproducing mode the apparatus is being operated.

Figure 2:
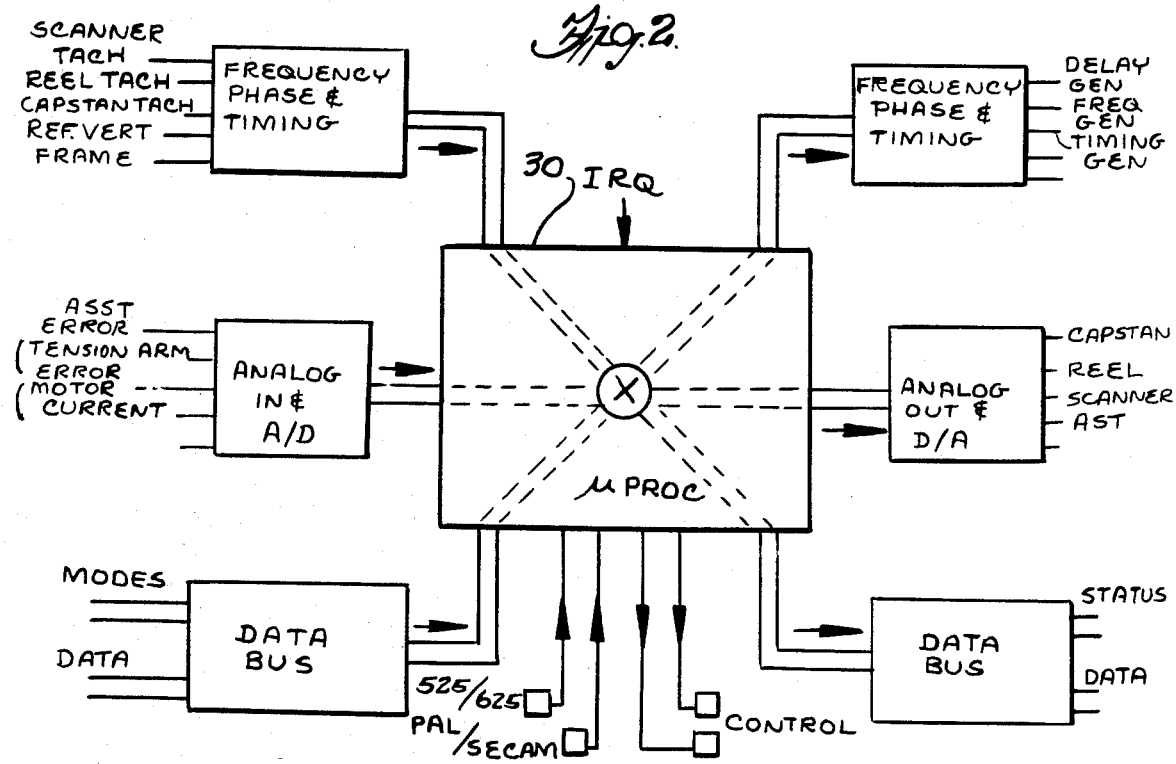
FIG. 2 is another functional block diagram of the microprocessor and illustrates the manner in which it receives input information relating to the operation of the apparatus and provides output signals that are used to control the operation of the apparatus.

While the functional block diagrams shown in FIG. 1 illustrate the interaction of the microprocesor with the various servo systems of the apparatus, with machine control and with the time base corrector and the like, the system can also be functionally described in terms of input and output signals that are provided to and from the microprocessor and this functional block diagram is shown in FIG. 2. The microprocessor 30 receives frequency, phase and timing data shown by the upper left functional block including such input signals as head scanner tach pulses, reel tach pulses, capstan tach pulses, reference vertical and frame timing signals, which are converted into digital information for processing by the microprocessor. The microprocessor also receives analog information shown by the block left of the microprocessor which is converted into digital information for processing by the microprocessor and such analog input signals include the automatic scan tracking error signals, the tension arm error signals and various signals related to motor currents of the reel drive motors, the capstan drive motor and the head scanner drive motor. The data bus also receives operating mode information as well as other machine control data and it processes this information and provides status information and other data. The microprocessor 30 generates digital information which is converted to analog information and these analog output signals include control signals for the capstan servo, the reel servo, the head scanner servo and the automatic scan tracking servo. Similarly, the microprocessor provides frequency, phase and timing output information which include delay signals, phase and timing output information that are used by the various servos and other circuits of the apparatus.

The microprocessor controlled system of the present invention has a unique advantage in that it is adaptable for recording and reproducing video signals from any standard worldwide format, i.e., it can record and reproduce a NTSC signal having 525 lines or a PAL or SECAM signal having 625 horizontal lines. The input control line can be set to operate either as a 525 or 625 line system and the various constants and other softward values which control the servos and other circuitry of the apparatus will be selected for proper operation. Similarly, another control line can be set for either a PAL or SECAM format system once a 625 line system is specified. The software in memory includes instructions and numerical constants that will permit the apparatus to properly operate regardless of the television signal format that is selected.

In accordance with an aspect of the present invention, the microprocessor controlled servo system described herein is adapted to control the reel servo system and the head scanner servo system during the high speed shuttle mode in a way so as to protect the recording and reproducing heads, while the tape is being wound off one of the reels onto the other. In the past, as the tape was nearing the end so as to be wound on a single reel during high speed shuttle, the potential for chipping the ceramic recording and reproducing heads was quite high. In accordance with an aspect of the apparatus described herein, during high speed shuttle, reel tape pack diameter information that it is determined by the microprocessor is used to control the reel servo and the scanning head servo to perform a sequence of events which substantially reduce if not eliminate the possibility of heads being chipped. When the microprocessor determines that the tape has almost reached the end of being wound off on one reel, it controls the reel servo to stop the tape and it also reverses the head scanner motor current to brake the rotation of the heads. After the tape has been stopped, the reel servo moves the tape at a relatively slow rate, e.g., twice normal recording speed, and the rotating head assembly is allowed to coast while the tape is wound entirely off of one reel on to the other.

The apparatus is programmed to operate in various operating modes as is shown in the broad flow chart of FIG. 3a. The flow chart representing microprocessor software shows that once the machine is initialized, a mode is selected and these modes include stop, record, slow and fast motion reproduce, stop motion or still frame reproduce, ready and normal play. Once the apparatus is placed in an operating mode, then it undergoes a mode test to determine if it is a valid mode and if such is the case, it will return to that mode and begin running the program that controls the appartus in the mode. If the mode test is invalid, then it will return to the stop mode and the apparatus will stop. After the apparatus is placed in a valid mode, it will continue in that mode until some event occurs, such as a mode change or a completion of some operation. Included as part of each operating mode are various subroutines which are called as shown in FIG. 3a. Certan ones of these subroutines are used in various ones of the operating modes. For example, the play mode will contain a block of code instructions that will call up various subroutines in the specified order. As long as the apparatus is operating in the play mode it will repetitively go through this block of code instructions. When the head scanner/tachometer occurs, it will cause an interrupt to the microprocessor as shown in FIG. 3b.

The microprocessor operates on an interrupt basis, with an interrupt resulting from one of three inputs. The software determines which input caused the interrupt and the microprocessor then enters the appropriate block of code which runs through various subroutines until it reaches the end and then returns to the instruction that had previously been completed prior to the interrupt. The scanner tachometer pulse originally triggered a counter which has a count that exceeds the maximum time required to store all current relevant information in stock registers in the microprocessor. When this is done, it is ready to immediately perform the instructions in the scanner 1 block of code. This is carried out by the scanner interrupt block of code which causes the microprocessor to store the information and then literally wait for the scanner 1 interrupt. After the scanner 1 block of code is run, the microprocessor removes the information from the stack registers and resumes running through the instructions specified by the operating mode.

Complete software for operating the microproccessor for controlling all of the servos and other operations shown in the block diagrams of FIGS. 1, 2, 3a and 3b is contained in the computer code listings attached hereto as Appendix A. The program is written in a clear and concise manner to minimize the amount of memory that is required to perform the various operations. In this regard, FIG. 4 illustrates a memory map having 32,000 memory locations. As is shown in FIG. 1, the entire circuitry for the various servos and other operations are contained in two printed circuit boards with the upper first board containing most servos and the microprocessor itself and the second board containing the automatic scan tracking servo, reference generator, tape sync processor and time base corrector interface circuitry. In the memory map shown in FIG. 4, the program is written to utilize various portions of the 32K memory and the memory is segregated into eight separate 4K sections 50 through 57, which are decoded by address bits 12 through 14 which are used to place memory instructions in certain areas of the memory. For example, the address area $S_4$ is used to identify the input/output circuitry of the first board and area $S_5$ identifies a 4K section of memory wherein instructions relating to the operation of input/output portion of the second board are contained. Sections $S_1$, $S_2$ and $S_3$ are shown to be decoded but are not used during operation of the apparatus. Thus, from the illustration of FIG. 4 it should be appreciated that the entire operation of all of the servos and other operations shown in the block diagram of FIGS. 1 and 2 are carried out utilizing less than 4K of program. The operation of the automatic scan tracking servo system will now be broadly described on a functional level, followed by a more detailed description of the servo as well as other portions of the microprocessor controlled system.

Broad Automatic Scan Tracking Servo Description

In accordance with the present invention, the microprocessor controlled automatic scan tracking position of the apparatus of the present invention will now be described in conjunction with the block diagram of FIG. 5. Other aspects of the automatic scan tracking servo will also be hereinafter described with respect to the block diagram of FIG. 8.

The automatic scan tracking servo system shown in functional block diagram form in FIG. 5 controls the automatic tracking of the head during reproducing in the various operating speed modes such as slow motion, still frame or fast motion. As shown in FIG. 5, the idler 80 tachometer provides pulses to a tape period detector 200 which essentially measures the speed of the movement of the tape and does so by measuring the period of tape movement very accurately. The tape period detector effectively measures the frequency for the purpose of predicting the desired position of the head as a function of the tape speed. The tape period detector provides two 8-bit words to the microprocessor 30 which performs two functions utilizing the calculated period. The microprocessor applies a digital word to a ramp generator 202 which is actually an error generator which generates 2 digital equivalent of a voltage ramp signal whose slope is a function of speed. In effect it is generating a predicted tracking error which comprises a voltage whose slope increases as the tape speed is increased. Conversely, the slope of the voltage decreases as the tape speed decreases. The tracking error output is applied to a modifier circuit 204 which either increases or decreases the value, i.e., modulates the predicted ramp tracking error signal in accordance with d.c. errors that are detected. It effectively modifies the tracking error or slope of the ramp in order to obtain a true ramp cracking error signal that maintains the head accurately on the track during reproducing. The tape speed signal is also compared with the output of the modifier to determine if a track jump command should be issued. In other words, if the elevaton of the head, i.e., the transverse position thereof, at the appropriate time during each revolution is such that, considering the speed that the tape is being moved, that it will reach a particular extended position, then a jump command will be issued to the jump track block 206 which will add a jump signal to the ramp tracking error signal at its output. The composite ramp tracking error signal is generated digitally and is converted by a digital-to-analog converter 208 to analog form for application to a summer 210 which sums the converted signal with that produced by a dither generator 212 and with an a.c. coupled error signal from a digital-to-analog converter 214 via capacitor 216 and amplifier 218. The summed signals are applied to a drive amplifier 220 which drives a deflectable piezo-ceramic bimorph element 222 carrying the video transducing head. An electronic damping loop indicated generally at 224 which is virtually identical to that described in Ravizza U.S. Pat. No. 4,163,993, assigned to the same assignee as the present invention, is provided. Also, the RF signal from the video head is applied to an amplitude modulation detector 226 which detects the RF signal having an envelope with an amplitude and phase, which vary in accordance with the dither signal that is applied thereto by the dither generator 212 and the position of head relative to the recorded track. This detected signal is in turn synchronously detected by a synchronous detector 228 to provide an analog positional error signal that is converted from the analog to a digital domain by the analog-to-digital converter within the microprocessor. This digital error signal is compared with a zero error signal (ground) and the microprocessor provides the d.c. error for modifying the error signal via the ramp modifier 204. The signal is also applied to a digital filter within the microprocessor which detects high rate geometric errors caused by distortions in the track or the like and its output is applied to the digital-to-analog converter 214 for analog conversion and combining with the ramp tracking error signal.

With respect to the operation of the digital filter shown in FIG. 5, it performs an integrating operation which is essentially an averaging function that is accomplished in the microprocessor. It essentially operates by utilizing three memory locations and performs an averaging of each sample location over several revolutions to obtain an average value for each of the sample locations. For each sample location, a digital number corresponding to the averaging operation is applied to the digital-to-analog converter 214 of the a.c. error correction circuitry shown in FIG. 5. Basically, at the first memory location, the most recent sample is averaged with the preceding samples by adding the value of the averaged preceding samples to the new most recent value and dividing by two. This value is then inserted into the first memory location. The second memory location utilizes the value placed in the first sample location with the precedingg average value in the second location and sums them, divides by two to obtain the new value for the second memory location. The third memory location adds its previous average value with the new value from the second memory location, divides by two to provide a new value in the third memory location. This becomes the output of the digital filter which is applied to the digital-to-analog converter 214 and a.c. correction circuitry.

Broad Tape Sync Processing Circuitry Description

Figure 16:
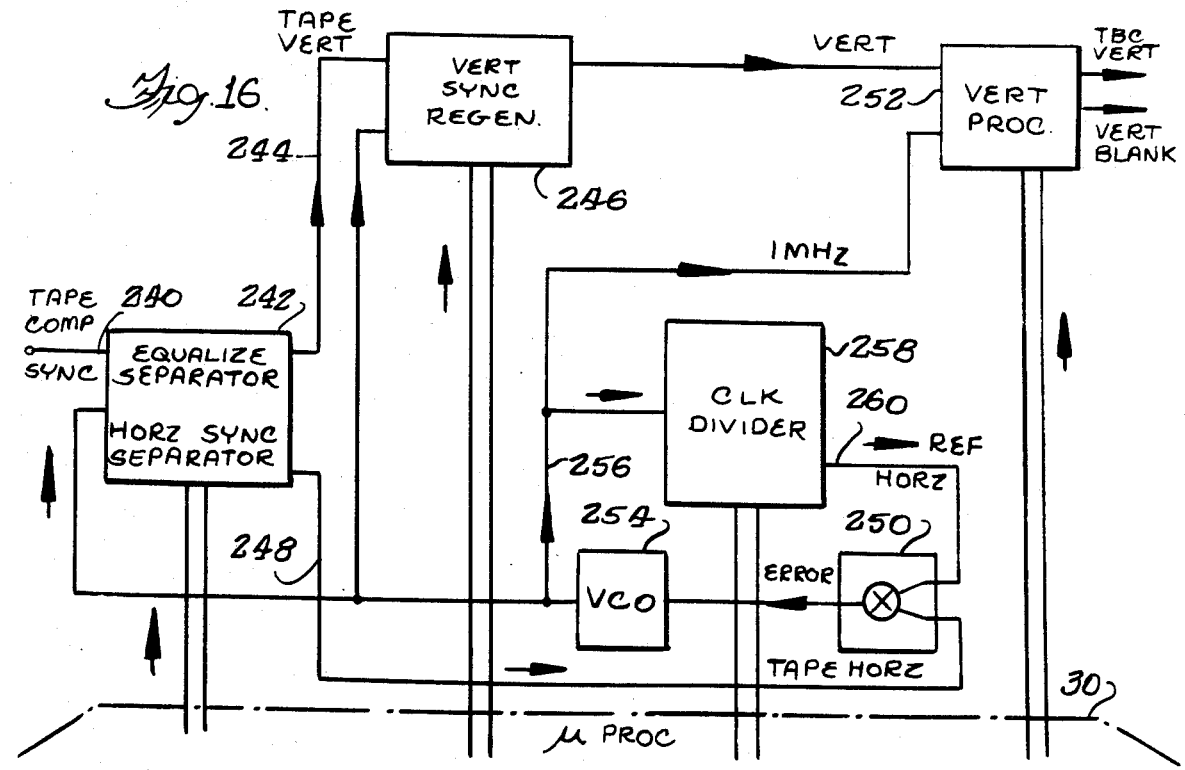
FIG. 16 is a functional block diagram illustrating the tape sync processor and time base correction interface circuitry.

With respect to the tape sync processing circuitry of the apparatus embodying the present invention, reference is made to the block diagram shown in FIG. 16 which is shown having the microprocessor 30 interfacing with several of the blocks shown therein for the purpose of changing values in various components depending upon whether the recorder is adapted to operate as a NTSC video recorder with 525 vertical lines per frame or as a PAL or SECAM recorder with 625 horizontal lines per frame. The block diagram is shown to have a composite sync signal from tape during reproducing applied via line 240 to an equalization pulse separator and horizontal sync separator circuit 242 which has an output line 244 which extends to a vertical sync regenerating circuit 246 and another output line 248 which applies an off-tape horizontal signal to a comparator 250 comprised of a digital sample and hold circuit. The vertical regenerator 246 provides a vertical sync signal to vertical processing circuitry 252 which provides a time base corrector vertical sync signal to the time base corrector circuitry and vertical blanking signals to the signal system circuitry during reproducing. The comparator 250 is part of an automatic frequency control loop that has a voltage controlled oscillator 254 having an output line 256 extending to the vertical processor 252 and to a clock divider circuit 258 which has its division number supplied by the microprocessor. The division number is different depending upon whether the recording apparatus is operating in a 525 line or 625 line system. The divider output line 260 is applied to the other input of the comparator 250 so that the comparator compares the reference horizontal with the tape horizontal, provides an error signal to the voltage controlled oscillator 254 for properly controlling the frequency output from the voltage controlled oscillator 254. As is evident from the control loop, the output of the voltage controlled oscillator 254 is synchronized to off-tape horizontal sync. Moreover, the output of the tape sync processing circuitry is synchronized to off-tape sync so that if the tape speed is increased or decreased, the horizontal and vertical sync signals will vary in accordance with the proper timing to maintain the synchronism. The vertical regenerating circuitry is also adapted to be free running even though equalization pulses may not be present from the equalization pulse separator. This is required because of the fact that if the elevation of the reproduce head is extended relative to its normal desired position, equalization pulses may not be reproduced and detected by the separator 242. The system therefore provides free running capability to apply equalization pulses where they should be if they are in fact not detected so that the vertical sync signals will continue to be present for operating the time base corrector. The system has another operational advantage in that if the recorder is turned on for the first time and the head is at an extended elevation or position such that no equalization pulses are being detected, it cannot supply them at the appropriate time because it has no memory of them previously occurring. In such instance, the microprocessor measures the elevation of the AST head and determines if it is in fact at an improper elevation to receive equalization pulses and if such is the case, when it will command a two track shift so that it will be placed in position where it will receive equalization pulses and will begin power operation.

The Microprocessor Circuitry

Figure 10A:
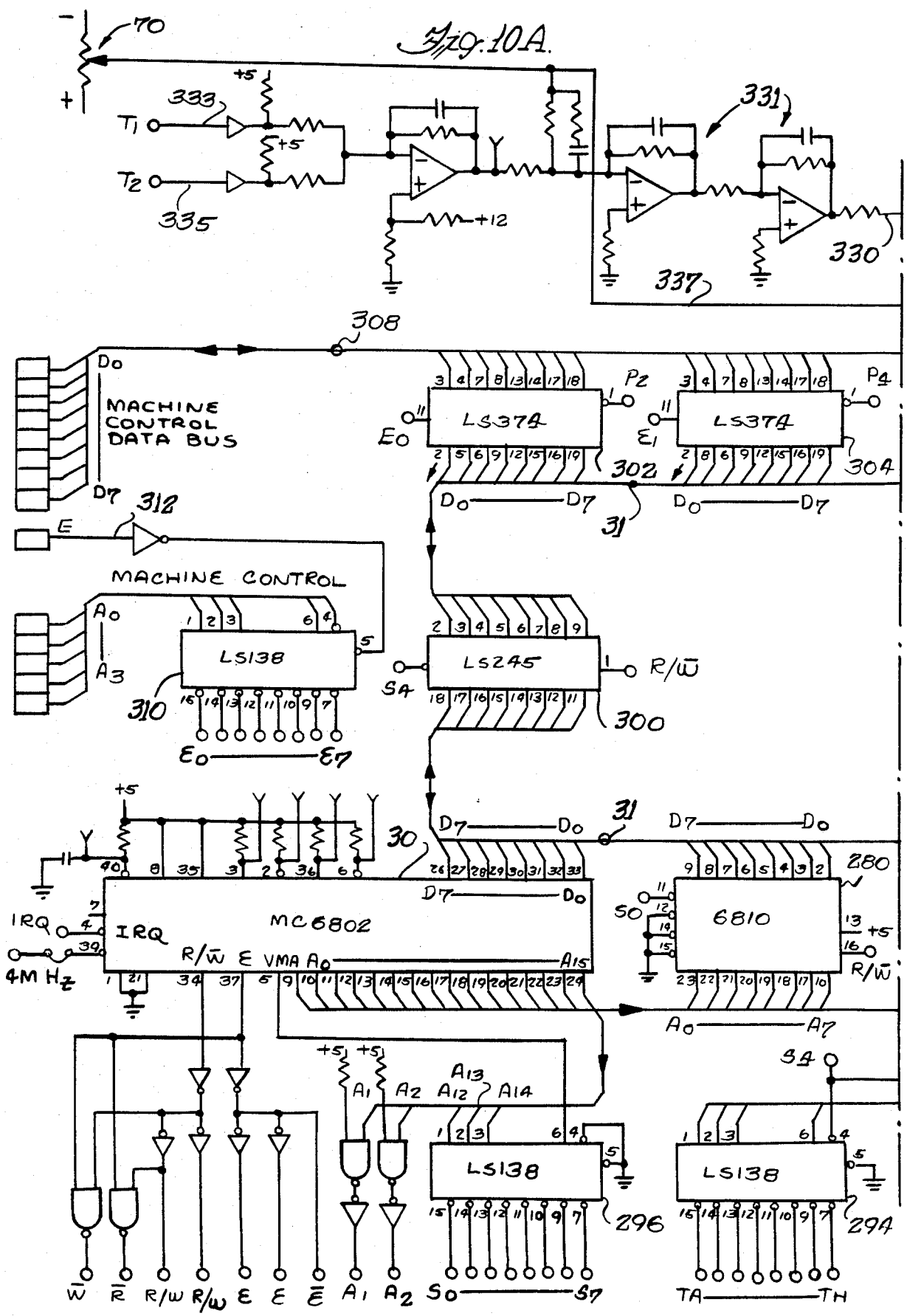
FIGS. 10a and 10b together comprise a detailed electrical schematic diagram illustrating the microprocessor together with machine control interfacing circuitry and multiplexing analog-to-digital converting circuitry.

Before describing the detailed electrical circuit schematic diagrams of the head scanner servo previously described with respect to the functional block diagram, the schematic diagrams which contain the microprocessor 30 itself will be briefly described in connection with FIGS. 10a and 10b which together comprise a single schematic. As previously mentioned, and as has been shown by the block diagram of FIG. 1, the bulk of the circuitry of the apparatus described herein is contained on only two printed circuit boards and one of said printed circuit boards contains the microprocessor itself. The layout of the circuitry is such that address control of bidirectional buffers enable the data bus from the microprocessor to be connected to either the first or the second printed circuit board. As shown in FIG. 10a, the microprocessor 30, which is a Motorola integrated circuit Model MC 6802 has 16 address lines which address circuit components as well as specific addresses of memory circuits. As shown on the lower portion of the microprocessor 30 in FIG. 10a, address lines $A_0$ through $A_{15}$ extend rightwardly to a random access memory 280 which is controlled by address lines $A_0$ through $A_7$, as well as respective programmable read only memories 282 and 284 FIG. 10b which are controlled by address lines $A_0$ through $A_{11}$. The address lines also extend to a buffer 286 which has output lines indicated generally at 288 which extend to the second printed circuit board address lines. The lines 288 also extend downwardly to respective decoder integrated circuits 290 and 292 which are used to select ports $P_0$ through $P_{15}$. The address lines also extend to yet another decoder 294 which provides selection of various programmable timer integrated circuits $T_A$ through $T_H$.

Decoders 290, 292 and 294 are enabled when a master decode enable line $S_4$ is active and this is provided by a master decode circuit 296 located to the left of the decoder 294. As is clearly illustrated, address lines $A_{12}$, $A_{13}$ and $A_{14}$ from the microprocessor 30 control the address selection master decode enable output lines $S_0$ through $S_7$ that activate various portions of the circuitry. For example, when active the decoded output line $S_0$ enables the random access memory 280, decode output $S_6$ enables the memory 282 and decode output $S_7$ similarly enables memory 284. The data bus 31 from the microprocessor comprises eitht output lines $D_0$ through $D_7$ extending to the memories 280, 282, 284 as well as to bidirectional buffers 298 and 300. Buffer 290 has output lines that extend the data bus to the second printed circuit board, and it is activated by the decode output $S_5$. Activation of the decode output $S_4$ enables the decoders 290, 292 and 294 as well as the other bidirectional buffer 300 which effectively extends the data bus to the remaining circuitry shown in the upper portion of FIGS. 10a and 10b and to remaining circuitry on board No. 1.

Figure 10B:
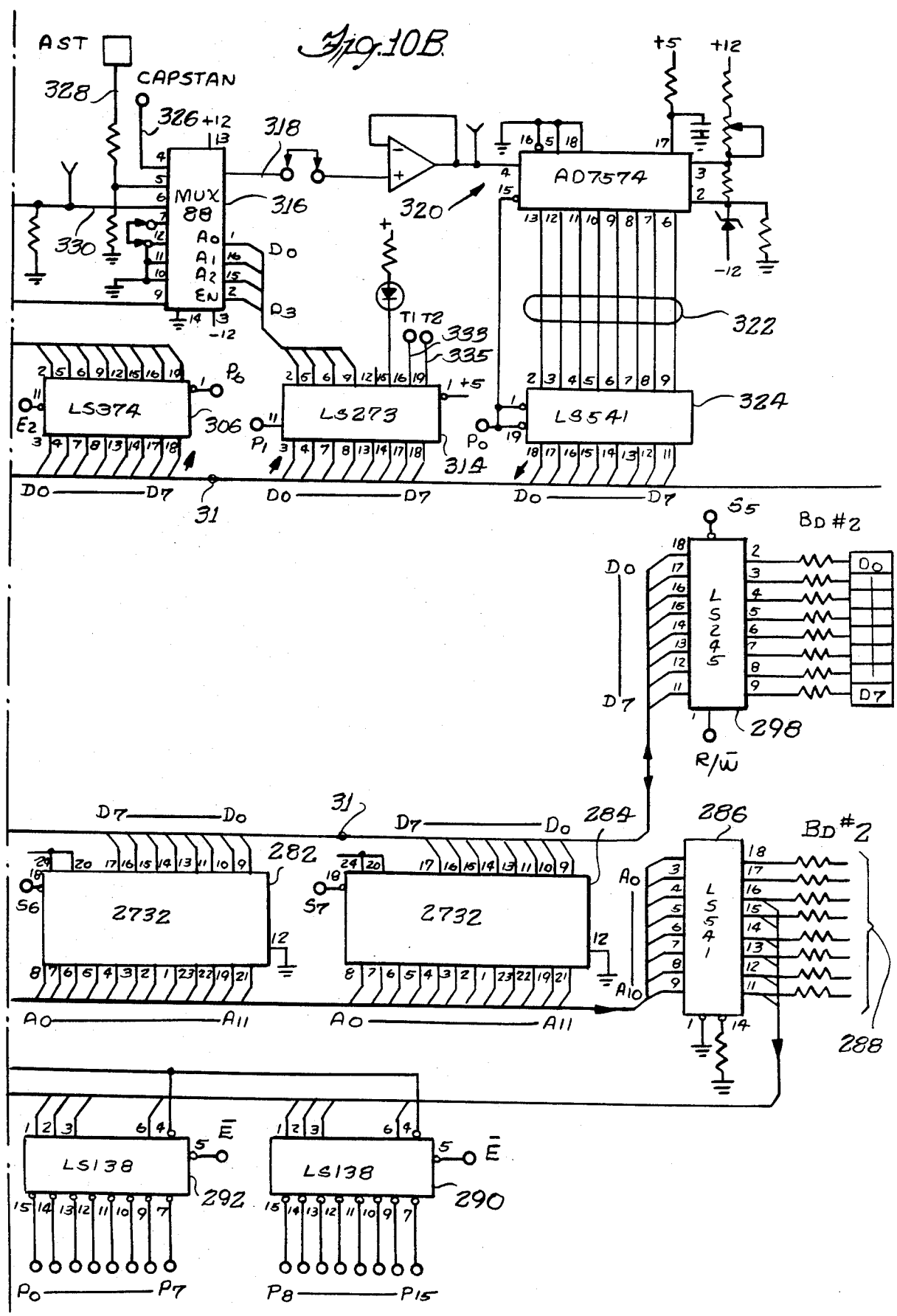

As shown in FIG. 10a, the data bus 31 has input latches 302 and 304 connected thereto and an output latch 306 being shown in FIG. 10b. The data lines 308 are also connected to these latches and the lines 308 represent a data bus to the machine control system which has a separate microprocessor controlled system for carrying out other machine control functions of the apparatus independently of the system controlled by microprocessor 30. The interaction of operator control and mode switches, diagnostics and the like with the servo system of the present invention is carried out through this data bus via the latches 302, 304 and 306. These latches are respectively enabled by enable lines $E_0$, $E_1$ and $E_2$ which are decoded outputs of a decoder circuit 310 that has operator activated address lines $A_0$ through $A_3$ from the machine control system. The decode circuit 310 is enabled by a line 312 from the machine control system. By selectively enabling decode output lines $E_0$, $E_1$ and $E_2$, data can be input into the latches 302 and 304 for communication onto the data bus of the microprocessor 30 and enabling the latch 306 permits data from the microprocessor 30 to be latched therein for communication to the machine control system via lines 308.

The remaining portion of the circuitry shown in the upper portion of FIGS. 10a and 10b concern the analog information input that is provided to the microprocessor 30. When port $P_1$ from decoder 292 is active, a latch 314 that is connected to the data bus can receive a data word which decodes an address for controlling a multiplexing switch 316. The switch 316 selects one of the left inputs thereof for application onto line 318 that extends to an analog-to-digital converter, indicated generally at 320, having output lines 322 which extend to a latch 324 which applies data onto the data bus for use by the microprocessor when a port line $P_0$ is enabled from the address decoder 292.

The multiplexing switch 316 can select a capstan servo control track error signal applied via line 326, an automatic scan tracking movable element position error signal applied via line 328 or a signal that is indicative of the position of the tension arm 70 applied via line 330. The circuitry at the upper portion of FIG. 10a provides an analog signal on line 330 that represents the position of the previously described tension arm through appropriate loop compensation circuitry indicated generally at 331. The arm positional reference for forward and reverse arm locations during shuttle and still frame reproducing is set by coding lines 333 and 335 by means of the output latch 314 from the microprocessor. In addition, line 337 can be selected to measure the actual mechanical arm position for tape threading and unthreading.

The Automatic Scan Tracking Servo Circuitry

While the operation of the automatic scan tracking system (AST) has been broadly described in connection with the functional block diagram of FIG. 5, the control of the correction and of the dither generator is such that there are significant improvements in the control and operation of this portion of the AST servo, compared to prior art systems such as those embodied in U.S. patent application Ser. No. 677,815 and U.S. Pat. No. 4,151,570, which are assigned to the same assignee as the present invention, and which generally perform similar functions. As has been broadly described, the dither generator produces a signal that is applied to the summer 210 shown in FIG. 5 which varies the drive signal to the drive amplifier 220 for deflecting the bimorph 222 in a manner whereby it is caused to oscillate the position of the head transversely relative to the recorded track as the head reproduces a track. The transverse movement is in the form of a dither or sine wave signal that is applied to move it slightly relative to the track to generate a track position error signal which is in the form of an amplitude modulation of the RF video signal reproduced by the dithered head.

While the use of dither is described in the aforementioned Ravizza U.S. Pat. No. 4,151,570, the amplitude of the dither applied to the bimorph in the present application is at a significantly reduced level so as to produce a lesser amount of intentional head to track deviation for the purpose of detecting tracking error. The monitoring of the error signal is also accomplished by the digital filter to provide a.c. correction to generate an additional error signal component for removing high rate geometric errors that are present. In the aforementioned Ravizza U.S. Pat. No. 4,163,993, geometric errors were detected and an a.c. error signal was produced in the analog domain by monitoring component signals at 60, 120 and 180 Hz frequencies and these error signals were combined to provide an error correcting signal for removing the high rate geometric errors. Since the dither frequency is desirably at a frequency of about 450 Hz, for reasons fully discussed in the aforementioned Ravizza U.S. Pat. No. 4,151,570, it should be appreciated that it is not possible to provide closed loop correction for errors that occur around the frequency of 450 Hz, for to do so would provide a bandwidth of only approximately 45 Hz in such a closed loop system. Accordingly, samples at frequencies of 60, 120 and 180 were taken over several cycles, integrated and summed to provide an error drive signal for providing error correction for such high rate geometric errors.

It should be appreciated that errors actually exist at much higher frequencies than 180 Hz and it is therefore desirable to provide more accurate geometric error correction during operation. If such can be reliably done, a more precise correction of geometric errors can be accomplished. Also this can further reduce the required amplitude of the applied dither signal.

The present invention significantly increases the number of samples that can be taken from the reproduced RF video envelope and can generate a more accurate a.c. or geometric error correction signal in a way to increase the bandwith up to approximately 840 Hz which represents a substantial improvement over prior art systems. Moreover, the dither, the synchronous detection, and the sampling of the signal are totally synchronized so that error measurements are accurate from one head scanning drum revolution to another and with respect to the maximum excursions of the head during the dithering operation.

Unlike the prior art invention, the present apparatus is completely phase synchronous, i.e., position synchronous as well as frequency synchronous, so that variations that would otherwise occur as a result of loss of phase synchronism will not be present and will therefore not detrimentally affect the accuracy of the curve fitting for corrrecting geometric errors. Additionally, the location of the samples can be moved to accurately fit the active video RF signal.

A functional block diagram of the circuitry that accomplishes the foregoing objectives is shown in FIG. 8 together with the accompanying timing diagrams of FIGS. 6 and 7. Turning initially to the block diagram of FIG. 8, the block diagram shows the dither generator 212 which is essentially a programmable counter that is controlled by the microprocessor 30 and provides clock pulses at an output 340 which clock a D flip-flop 342 that is connected to comprise a divide by two. The flip-flop 342 is connected by line 344 to control the operation of the synchronous detector 228 and also provides an input to another D flip-flop 346 that is in turn clocked by a dither phase modulator circuit 348 that is also controlled by the microprocessor 30. A dither phase adjustment manually programmable switch 350 is connected to the microprocessor and provides a digital number to the microprocessor which is used to control the dither phase modulator 348 to either advance or delay the phase of the dither signal that is controlled by the dither generator. The output of the dither phase modulator clocks the D flip-flop 346 whose output is applied to a dither filter 352 that converts the D flip-flop square wave output into a sine wave that is applied to the drive amplifier 220 that drives the bimorph as previously described. The reproduced RF signal from the video head is received by the RF detector 226 which has a drop-out control line 354 for blocking the RF signal during the drop-out time during each revolution of the scanning drum. The output of the RF detector 226 is applied to the synchronous detector 228 which has its analog output applied to an analog-to-digital converter in the microprocessor via line 356.

The output from the divide by two 342 controls the switching of the synchronous detector 228 so that it inverts the RF detected signal at the appropriate rate so that the magnitude of the error that is present is provided at the output 356 thereof, except during the drop-out time. The microprocessor has interrupt commands which are effective to store in internal memory a digital word corresponding to the analog value at the sample time that is determined by the occurrence of an interrupter. Through the course of a single rotation of the scanning drum carrying the reproducing head, i.e., one head pass, 14 samples are stored in memory for the NTSC 525 line system, (15 samples for the 625 line PAL or SECAM formats) from which the digital filter shown in FIG. 5 and the a.c. correction circuitry generates an a.c. error correcting signal which removes high rate geometric errors.

In accordance with an important aspect of the AST servo of the present apparatus, the relative timing of the operation of the dither signal, the synchronous detector and the interrupts which control the taking of the samples of the error are accurately synchronized to each head rotation so as to provide accurate error measurements from which the digital filter generates the a.c. geometric error correction signal.

The nature of the operation of the block diagram of FIG. 8 can be more readily understood from the timing diagram shown in FIGS. 6 and 7. Turning initially to FIG. 6(1), a voltage waveform of the signal that is applied to the bimorph during still frame reproducing is illustrated and has a generally upwardly inclined portion with sharp downward resets occurring during every head pass or rotation of the scanner drum carrying the head. The general operation during still frame reproducing, in terms of the reset and ramp movement of the transducing head is comprehehsively described in Hathaway et al. U.S. patent application Ser. No. 677,815. In order for the transducing head relative to the recorded tracks on tape for all the tape speeds other than normal speed (the tape speed during recording), the transducing head must be gradually ramped in one direction or another depending upon whether the tape is moving at a speed less than normal speed or greater than normal speed and the voltage waveform in FIG. 6(1) illustrates the movement of the transducing head during still frame reproducing which requires a reset at the completion of each rotation of the transducing head. FIG. 6(1) also illustrates a greatly exaggerated sinusoidal or dither signal applied to the bimorph carrying the head which results in the head being moved in a sinusoidal fashion transversely of the recorded track as it moves along the track. This provides an amplitude modulation of the envelope of the reproduced RF signal which is detected and used to derive an error correcting signal in the manner disclosed in the aforementioned Ravizza U.S. Pat. No. 4,151,570 as well as in the Ravizza U.S. Pat. No. 4,163,993. The relative positions of the upwardly inclined ramp and reset portions of the deflection producing voltage waveforms shown in FIG. 6(1) and the RF envelope shown in FIG. 6(2) illustrates that the resets occur during the drop-out located between each RF portion. The once around scanner tachometer signal shown in FIG. 6(3) also occurs in close proximity to the drop-out and the reset pulse. It is this tachometer pulse signal that provides the essential timing for the operation of an interrupt command (IRQ) shown in FIG. 6(4) as well as the operation of a synchronous detector which switches the applied dither signal to measure the head tracking error detected through the use of dither. The exaggerated dither signal is shown in FIG. 6(5), the synchronous detector switching waveform is shown in FIG. 6(6) and the output of the synchronous detector is shown in FIG. 6(7).

As previously mentioned, in the NTSC format there are 14 samples taken along the active video portion and these samples, labelled $S_1$ through $S_{14}$, are located within the RF envelope and are shown on the voltage waveform of FIG. 6(1) as well as on the waveforms shown in FIGS. 6(5), 6(6) and 6(7). It is desirable to evenly distribute the samples along the active RF region so that the sample locations coincide with the peaks of the dither signal applied to the bimorph as shown in FIG. 6(5) and to appropriately locate them so that all 14 samples are present during each scan or pass of the reproducing head along the track. The samples that are taken are a function of the timing of the interrupt commands and are timed to the scanner tachometer pulses which bear a distinct positional relationship with the transducing head since the head and tachometer are both mounted on the rotating scanning drum.

It should be understood that while the 14 samples (for a NTSC format signal; 15 samples for a PAL or SECAM signal) are evenly distributed along the RF envelope, there could be additional samples taken or the same number of samples could be distributed therealong if desired. Since the bulk of the geometric errors generally are present at the beginning and at the end of each reproduced RF portion, it may be desirable to bunch the samples nearer the ends thereof to obtain somewhat different information than is shown and described with respect to FIG. 6. For example, while the samples shown in FIG. 6(7) are located at the peak of the resulting output of the synchronous detector, samples may be taken on opposite sides thereof near the peak if desired. Since the error is generally a cosine function, there could be 30 degrees variance from the peak and still obtain a reasonably accurate error measurement. Whether the samples are bunched in this manner or are evenly spaced throughout the RF portion, the values of the error samples taken are then applied to the digital filter shown in FIG. 5 for the purpose of generating the geometric error correctional signal.

The location of the samples is a function of the timing of the interrupt commands and such can be programmed in a manner whereby the samples can be appropriately located along the active scan by the head as desired. Regardless of the actual programmed locations of the samples, switching by the synchronous detector is optimumly placed at the zero crossing of the dither sine wave as is shown by comparing FIG. 6(6) with FIG. 6(5) and therefore inverts the lower portions of the sine wave to obtain the rectified sine wave shown in FIG. 12(7). It is also desirable to have the interrupt commands occur in the middle of the half periods of the switching, i.e., midway between the switching transitions as shown, so that the error that is measured will be the peak error as shown in FIG. 6(7) rather than at a location that is substantially downwardly on the curve. Obviously, if the sample locations were close to the actual switching locations, then the error would be quite small and would provide inaccurate values relative to the actual error values. The location of the switching of the synchronous detector as well as the location of the interrupts are programmed in the software for the microprocessor and can be easily adjusted to provide accurate control. Moreover, the phase of the dither signal that is applied to the drive amplifier for driving the bimorph is also adjustable by virtue of the manual control of the dip switch 350 shown in FIG. 8.

To obtain the optimum phase synchronous relationship between the phase of the dither, the operation of the synchronous detector and the location of the interrupt for obtaining the samples from the synchronous detector, these three operations are synchronized to the occurrence of the scanner tachometer pulse during each revolution of the head. More particularly, at the occurrence of the once around tachometer pulse, the microprocessor utilizes a counter which counts from the occurrence of a tachometer pulse and keys the interrupt timing so that the first interrupt occurs at a precise time location after the occurrence of the tachometer pulse and then utilizes a second counting period to control the timing of subsequent interrupts so that 14 samples are optimumly provided during each cycle. At the occurrence of the next tachometer pulse, the first period is again counted, followed by the second period as is desired. Since the presence of the tachometer signal controls the critical timing between it and the first interrupt, the interrupt commands are retimed, if necessary, every revolution of the scanner. However, it should be appreciated that the outward appearance of the timing of the interrupts will not vary as is broadly shown in FIG. 6(4) and which will be more fully described with respect to FIG. 7. In addition to precisely controlling the location of the first interrupt relative to the tachometer pulse, the switching of the synchronous detector is also controlled in a very similar manner, i.e., a first period corresponding to a precise count in a counter controls the switching of the synchronous detector and subsequent switching is controlled by a second count which corresponds to another period so that the timing between switches of a synchronous detector is essentially identical to the period between occurrence of adjacent interrupts. This is evident by comparing FIGS. 6(4) and 6(6). The initial period after the occurrence of tachometer and the first switching of the synchronous detector is such that it occurs exactly midway between the interrupts or, stated in other words, that the interrupts occur midway between successive switchings of the synchronous detector as also shown by comparing FIGS. 6(4) and 6(6).

From the foregoing, it should be appreciated that the tachometer pulse controls the timing of the interrupts and of the switching of the synchronous detector very precisely as is desired and as can be appreciated from FIG. 8, the dither reference generator provides an output signal that is controlled by the counter for the synchronous detector and this control signal is also applied to the D flip-flop 346 for providing the dither signal to the drive amplifier 220. Thus, the dither is synchronously operated with the synchronous detector and is therefore synchronous with it. However, as is shown in FIG. 8, the output from the divide by two 342 is applied to the D input of the D flip-flop 346 which is clocked by the phase modulator of the dither that is in turn controlled by the dip switch 350 through operation of the microprocessor. Since the phase modulator clocks the D flip-flop 346, varying the value of the dip switch input to the microprocessor varies the phase of the dither. It can be advanced or retarded so as to locate the phase of the dither precisely with respect to the interrupts and the synchronous detector so that the relationship shown in FIGS. 6(5), 6(6) and 6(7) can be obtained. In this manner, the three components, i.e., the dither, the operation of the synchronous detector and the interrupts can be made to be exactly phase synchronous so that the error signals that are applied to the analog-to-digital converter in the microprocessor for use by the digital filter (FIG. 5) will be phase synchronous and constant from head pass to head pass and will therefore result in the very accurate geometric error correction signal.

To more fully appreciate the operation of the circuitry that precisely controls the location of the switching of the synchronous detector and of the location of the interrupts, the latter will be explained with respect to FIG. 7. The switching of the synchronous detector is accomplished in a manner that is substantially identical to that that will be described with respect to the interrupt timing, with the only difference being the particular count of the counter during the initial period and subsequent periods between switches thereof so that the relationship of the switching to the interrupt as previously described will be obtained. The tachometer pulses shown in FIG. 7(1) initiate a counter in the microprocessor which will count for a period A as shown in FIG. 7(2) so that when its terminal count is reached, the first interrupt will occur. After the A count has been accomplished, then the microprocessor switches to a B count which is substantially longer and corresponds to that which will evenly space 14 samples along the active scan region as shown in FIG. 6(1) as well as FIGS. 6(4) through 6(7). Interrupts will continue to occur subsequently of the first interrupt after the presence of a tachometer pulse until another tachometer pulse occurs. The subsequent tachometer pulse will cause the first period A to be counted again and will trigger the first interrupt after the tachometer pulse for a subsequent revolution of the head. However, since the interrupts are generally preferably evenly spaced for each head revolution, there will be no phase change during subsequent head revolutions once the system is set up, so that the termination time of the A period, which controls the location of the first interrupt, should be essentially identical to the location that would occur as a result of the termination of a B period of the final interrupt period before the occurrence of a subsequent tachometer pulse. However, the first interrupt after a tachometer pulse is actually controlled by the A period counter and the system is therefore assured of accuracy since it happens during each head revolution. Stated in other words, the interrupts are retimed every rotation of the head, whether retiming is necessary or not. This provides a safeguard to the accuracy of the system that prevents any drift in phase synchronism during operation.

While the automatic scan tracking servo has been functionally described with respect to FIG. 5 which illustrates the manner in which jumps are performed and error correction accomplished, the manner in which the error correction is carried out is shown in the block diagram of FIG. 9. This in turn is carried out by the specific circuitry shown in FIGS. 11a and 11b. Referring to the block diagram shown in FIG. 9, the microprocessor 30 communicates with a programmable timer chip 360 which has counter sections 362, 364 and 366, the section 364 of which operates as a one-shot multivibrator. A 1 MHz input signal on line 368 clocks the counters 362 and 366 and they operate such that counter 362 provides an output frequency count on line 370 that is fixed (although at different rates depending upon whether it is a 525 line or 625 line system). The counter 366 is programmable and provides a variable frequency output on line 372 which counter varies in accordance with the 16-bit word that is applied via the data bus 31 which reflects the tape speed period. Up/down counter clock logic, indicated generally at 374, effectively controls a clock rate which is a function of the difference between the frequency of the signals on lines 370 and 372 and the clock clocks an up/down counter 376 via clock line 378 with an up/down control line 379 also being controlled by the up/down counter clock logic. The incrementing or decrementing of the counter 376 generates the ramp slope which is the predicted value determined by the tape speed. The up/down counter provides an 8-bit value representing d.c. error signal on lines 380 which extend to a digital-to-analog converter 382 that has an analog output line 384 which applies the d.c. error signal to an amplifier 386 and to an amplifier 210. The lines 380 also are applied to a latch 390 that latches the value of the up/down counter and the microprocessor uses this 8-bit word to determine the position of the head for the purpose of determining whether a jump is to be made at the appropriate time. If a jump is to occur, a jump command on a line 392 will occur and when the scanning drum tachometer signal on line 394 is present, AND gate 396 will provide a signal to trigger the one-shot 364. A jump direction signal on line 398 is also applied to the clock logic 374 for determining the proper direction of a jump. The d.c correction loop utilizes the information that is latched in latch 390 and after processing, the microprocessor applies data via the data bus 31 to hard load the up/down counter 376 for the purposes of further incrementing or decrementing the count to apply the d.c. positional correction. At a different time the microprocessor hard loads a digital-to-analog converter 214 which provides an output to an amplifier 218 that is capacitively coupled by capacitor 216 to the amplifier 210. The up/down counter can be controlled by the counters 362 and 366 and additionally can be hard loaded by the microprocessors to provide the a.c. and d.c. error correction which results in the final automatic scan tracking error signal.

Figure 11A:
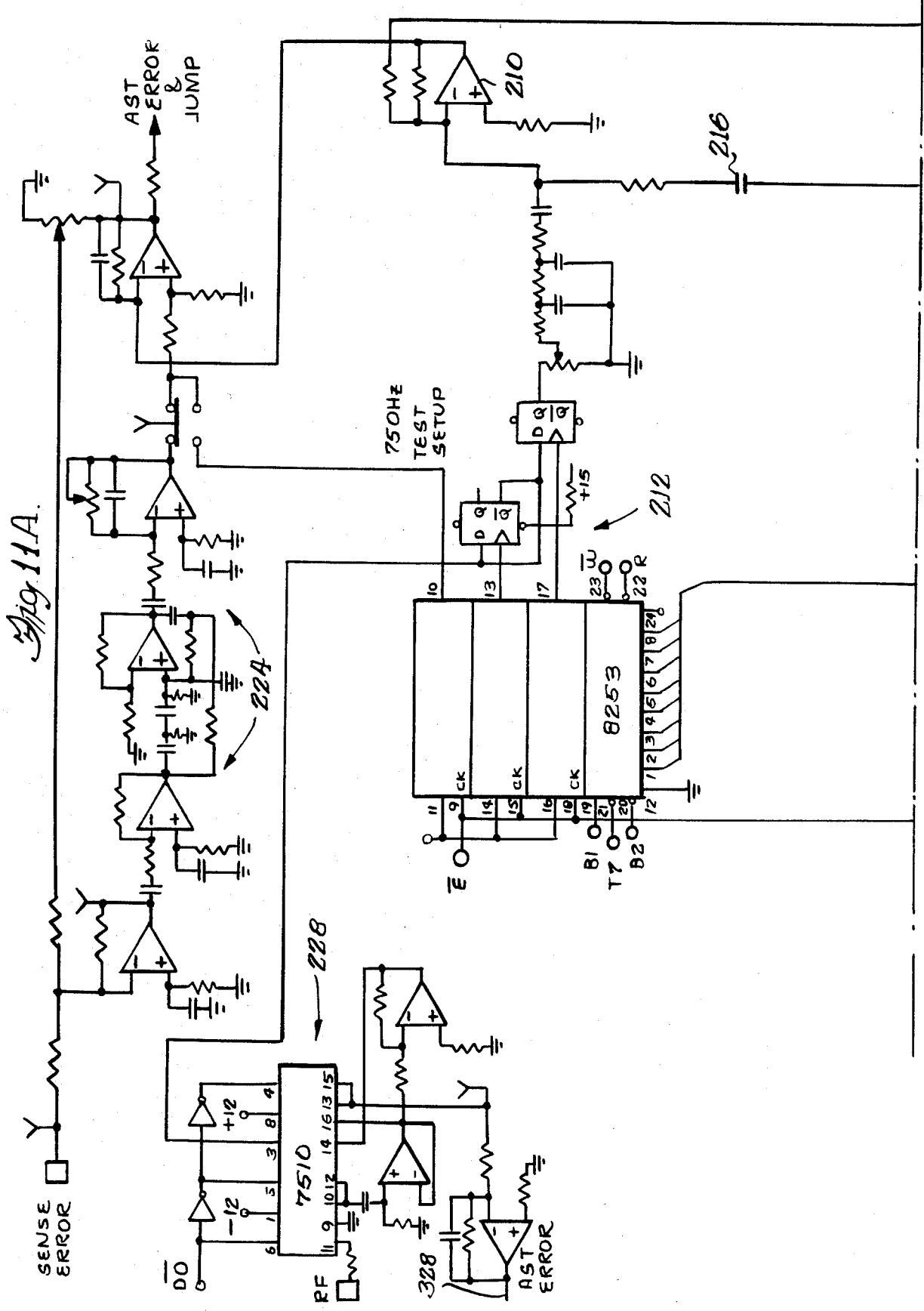
FIGS. 11a and 11b together comprise a detailed electrical schematic circuit diagram of circuitry which carries out the automatic scan tracking servo system damping, synchronous detection and ramp generating functions, which circuitry carries out the operation as shown in the block diagram of FIGS. 5, 8 and 9.
Figure 11B:
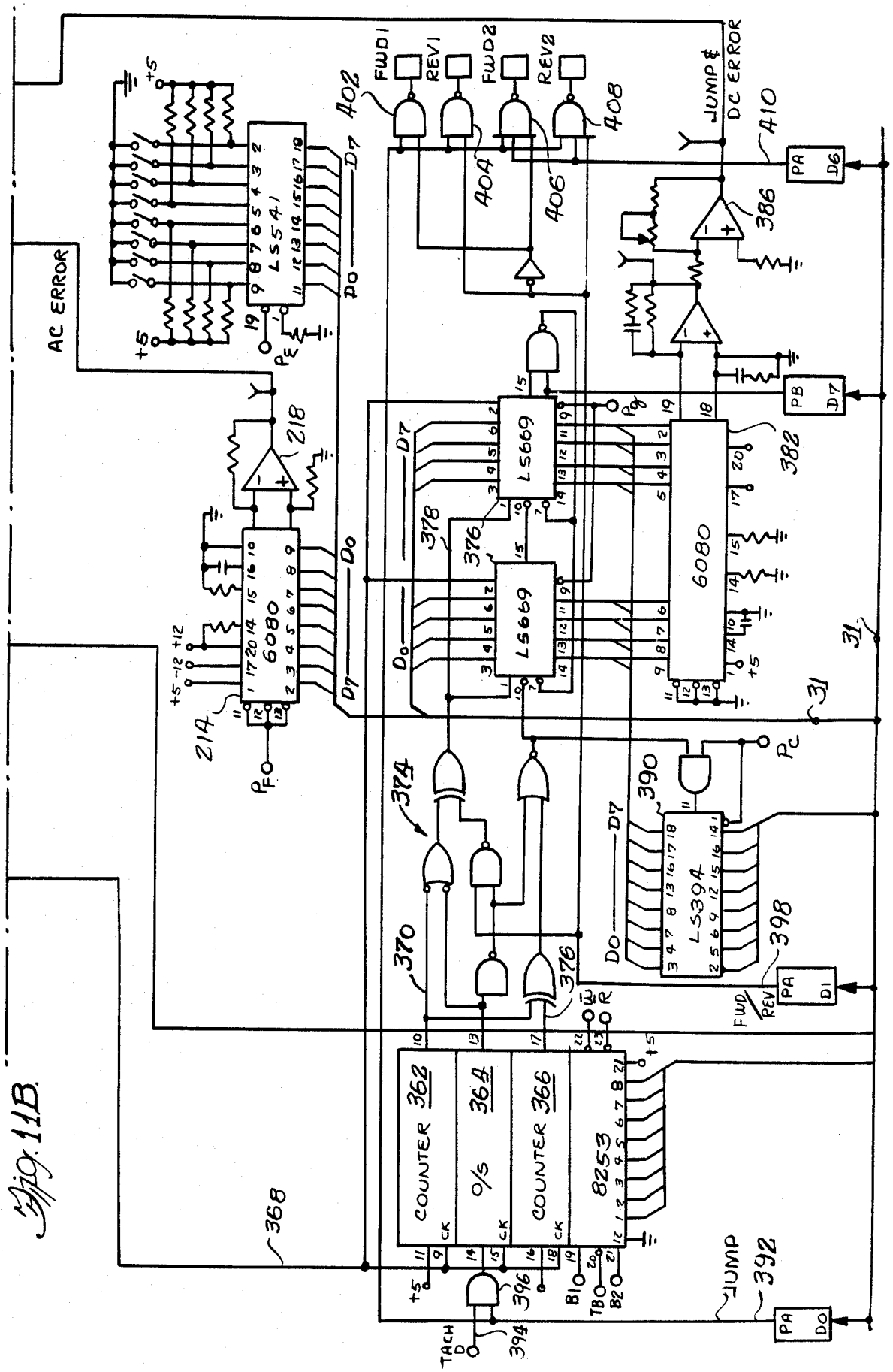

The detailed circuitry which carries out the operation of the functional block diagram of FIG. 9 is shown in the electrical schematic diagram of FIGS. 7 and 11a and 11b. The detailed operation of the schematic will not be described for the reason that it operates as described with respect to the block diagrams of FIGS. 5 and 9. As shown in the upper portion of FIG. 21a, the automatic scan tracking damping loop 224 is illustrated and it is virtually identical to that used in the Ampex Model VPR-2 recorder. The portion of the Product Manual which describes such operation is specifically incorporated by reference herein. As shown in FIG. 11b, the microprocessor applies signals onto the data bus for controlling the jump commands as previously described and a jump command on line 392 is gated to the one-shot 364 which is triggered when the once around scanning drum tachometer signal is applied to and enables the AND gate 396. The one-shot 364 controls the clock logic 374 to provide 64 counts into the up/down counter 376 to provide a discrete jump of predetermined magnitude for moving the movable element to make the head jump a track. The line 398 controls whether the jump will be forward or reverse and steers the logic 374 to control the up/down line of the up/down counter 376 apropriately. The active jump line 392 also extends to gates 402, 404, 406 and 408 so that one input of each of these gates is enabled when a jump is to occur. The forward and reverse line 398 also controls whether the forward or reverse gate is enabled and a third line 410 controls whether there will be a two track jump as opposed to a single track jump. The output lines from the gates 402 through 408 are applied to the time base corrector circuitry to inform it that a jump of the appropriate magnitude and direction is about to occur.

The Tape Sync Processing and Time Base Corrector Interface Circuitry

Although the various servo systems that are shown and described herein are primarily intended for use with a helical wrap recording and reproducing apparatus, the system could also be used for other types of recording and reproducing apparatus. The helical wrap recording and reproducing apparatus applies tracks to a tape during recording which are at an inclined angle relative to the longitudinal direction of the tape. Since the apparatus may preferably record a full field of information for each revolution of the scanning drum, each track will have a field of video information thereon, which for a NTSC format system will include 262½ lines of video information and for a PAL or SECAM format, 312½ lines of video information. The helical apparatus is also preferably equipped with automatic scan tracking as previously described, wherein the transducing head is attached to the end of an elongated movable element which can be moved transversely relative to the longitudinal direction of the tracks to thereby accurately follow a track or jump from one track to another during special effects reproducing.

The jumping from one track to another necessarily affects the relative timing of the video information, including the timing of the vertical and horizontal sync signals. For a NTSC system, the jumping from one track to an adjacent track will either advance or retard the relative timing by approximately 2½ lines (3½ lines for a PAL or SECAM format signal). The timing change would cause the image that is seen on a video monitor to vertically jump were it not for compensation that is applied to the signal by time base corrector circuitry in accordance with instructions issued by tape sync processing and time base corrector interface circuitry.

Figure 14A:
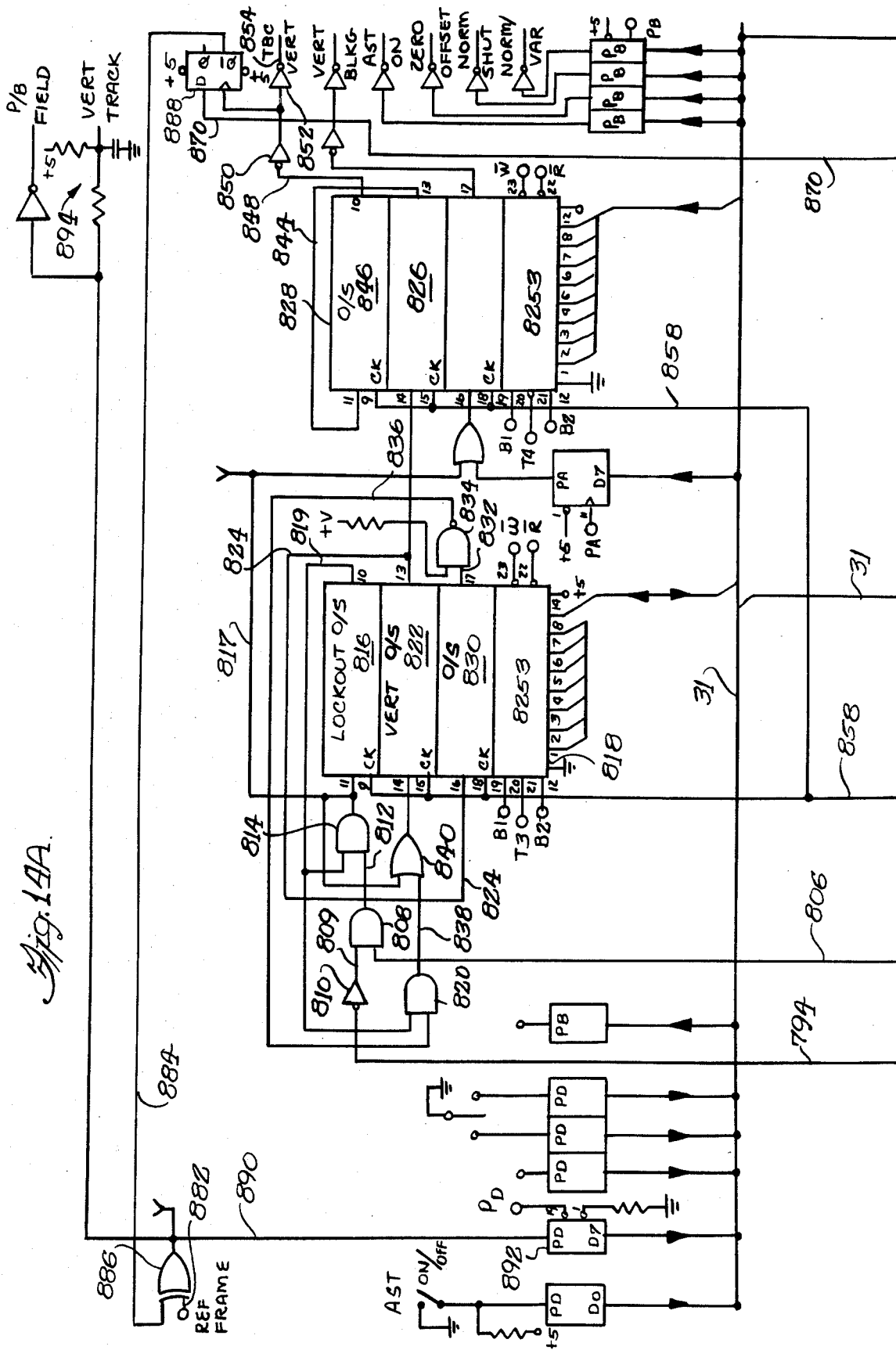
FIGS. 14a and 14b together form a detailed electrical schematic diagram of the tape sync processor and time base corrector interface circuitry of the apparatus embodying the present invention.
Figure 14B:
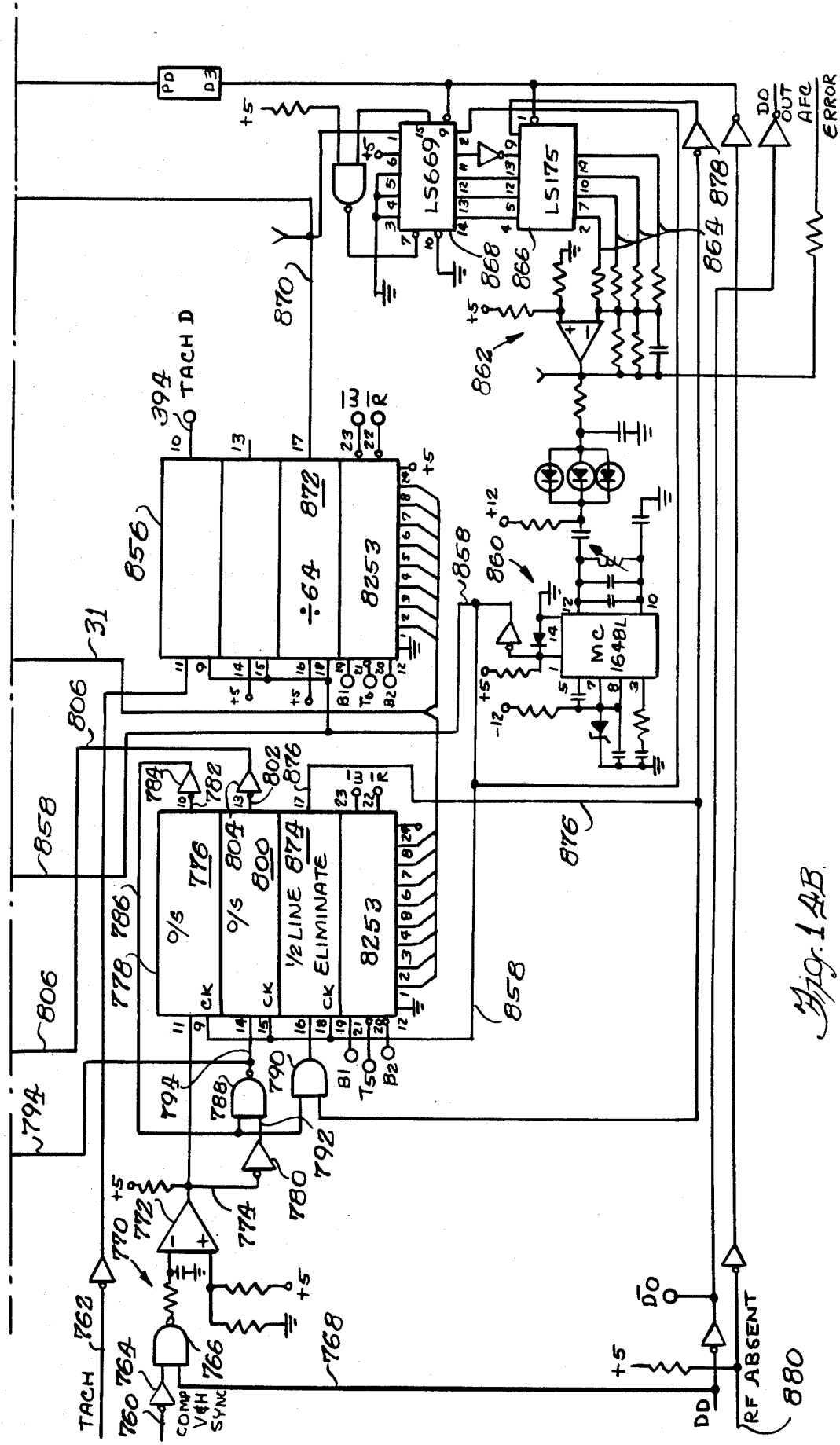

The circuitry that provides time compensation instructions is shown in FIGS. 14a and 14b and is defined as the tape sync processing circuitry which has a composite sync off tape input signal applied thereto on line 760 FIG. 14b, together with a tachometer signal 762 that is indicative of the tape speed. Utilizing this information, the tape sync processor provides a time base predicted vertical signal to the time base corrector which is time adjusted to provide the requisite compensation as a function of the direction of a head jump that is to be performed, as well as whether a jump had occurred in the prior revolution in a particular direction. It should be appreciated that a jump in one direction may advance the timing of the vertical sync whereas a jump in the opposite direction would necessarily retard the timing of the vertical sync. Since any change in the timing that occurred during the previous revolution would have affected the timing, the history of the previous revolution is necessary to accomplish the necessary compensation of the timing for an intended jump and this history must necessarily include information concerning whether a jump occurred at all, and if such did occur, which direction it occurred.

The tape sync processor is under microprocessor control and it detects the second equalizing pulse in each vertical interval. The microprocessor uses the second equalizing pulse as a timing base for making timing adjustments. The second equalizing pulse is chosen because it is the earliest consistently available timing information during the vertical interval upon which to make a reliable detection for providing the timing information necessary to predict adjustments to the location of the time base corrector vertical signal. The second equalizing pulse is detected every revolution and by virtue of the history of the prior revolution and compensating timing changes that were made, through software control, calculates the necessary predicted changes for the present revolution depending upon whether a jump is to occur in whichever direction. Moreover, by virtue of the fact that the basic clock for the tape sync processor circuitry is a multiple of the off tape horizontal sync, it is directly proportional to the tape speed and this clock is therefore accurate so that a constant number of counts in a counter can be used to provide the compensation of the time base corrector vertical sync that is provided to the time base corrector. This constant number of counts will be added or subtracted from the time of a one-shot counter that is controlled by the microprocessor and the compensation will be accurately predicted to place both the time base corrector vertical signal and regenerated equalizer pulse at the proper location to maintain a stable picture during reproducing.

Turning again to FIGS. 14a and 14b, the composite sync from the reproduced signal is applied to input line 760 FIG. 14b which is inverted by inverter 764 and applied to a NAND gate 766 that is disabled by a drop-out signal on line 768 if a drop-out signal is provided by drop-out detecting circuitry (not shown). The output of the NAND gate 766 is applied to a low pass filter 770 comprised of a resistor and capacitor and is then applied to the input of a slicer operational amplifier 772. The input signal goes high at the leading edge of vertical sync and this appears on output line 774 that is applied to a one-shot multivibrator 776 of a programmable timer chip 778 as well as to an inverter 780. The signal on line 774 is illustrated by the timing diagram of FIG. 15(1) and the inversion of FIG. 15(1) is shown in FIG. 15(2). The dotted representation shown in FIG. 15(2) represents the shorter equalization pulse which is approximately ½ the duration of the horizontal sync pulse shown by the solid representation. The horizontal sync pulse shown in FIG. 15(2) has its leading edge applied to input of the one-shot 776 and fires the same. The duration of the one-shot output on line 782 is longer than the equalization pulse and shorter than the sync pulse and this signal is shown in FIG. 15(3). Its output is inverted by inverter 784. Output line 786 is applied to one input of a NAND gate 788 as well as to one input of an AND gate 790. Since the signal on line 786 (FIG. 15(3)) and the output signal of inverter 780 on input line 792 will cause the output of NAND gate 788 to go low when both inputs are high, the output line 794 of NAND gate 788 will be provided with a negative followed by a positive-going transition only when an equalizing pulse is present shown by FIG. 15(5). As shown in FIG. 15, a horizontal sync pulse is low during the time in which line 786 (FIG. 15(3)) is high. Since the inversion of the equalizing pulse shown in FIG. 15(4) goes high (point 796 in FIG. 25(4)) prior to the completion of the high pulse (point 798 in FIG. 15(3)) shown in FIG. 15(3), an active low signal is produced only during the occurrence of the equalizing pulses as shown in FIG. 15(5). The active signal from the NAND gate 788 triggers a one-shot 800 whose output appears on line 802 and this is inverted by inverter 804 to provide a signal on line 806 which is shown in FIG. 15(6). The signal on line 806 is applied to one input of an AND gate 808 FIG. 14a, the other input of which is provided by the NAND gate 788 FIG. 14b via line 794 and inverter 810 and line 809. The output signal of inverter 810 is shown in FIG. 15(7).

Because these two inputs both satisfy AND gate 808 only during the second equalizing pulse, AND gate 808 provides a true output on line 812 at the occurrence of the second equalizing pulse as is desired. The second equalizing pulse is applied to one input of AND gate 814 which has its output connected to a lock out one-shot 816 of another programmable timer chip 818. The output of the one-shot 816 appears on line 819 which is applied to the other input of AND gate 814 as well as to one input of a second AND gate 820. An active output line 819 locks out the remainder of the vertical interval after the occurrence of the second equalizing pulse. The waveforms of the signals from AND gates 808, AND gate 814 and one-shot 816 are illustrated in FIGS. 17(1), 17(2) and 17(3), respectively. The output of a vertical one-shot 822 on line 824 is applied to the input of one-shot 826 of a timer chip 828 in addition to being applied to the input of a one-shot 830. One-shot 830 has output line 832 applied to a NAND gate 834 and the output of NAND gate 834 provides a signal on line 836 to AND gate 820 which effectively provides a self-regenerating input signal to one-shot 822 via line 838 and OR gate 840. Therefore, if the signal is lost, a vertical rate signal will continue to be produced by virtue of one-shots 822 and 830.

The output of one-shot 822 is shown in FIG. 17(4) and is shown to have its trailing edge programmably adjustable in accordance with the history of the prior revolution as has been previously described. Once the trailing edge upward transition occurs, it triggers the one-shot 826 which is also adjustable depending upon whether the previous revolution contained a jump in whatever direction. Output line 844 is applied to a one-shot 846 of constant duration and its output appears on line 848 that is applied via inverters 850 and 852 to provide the time base corrector vertical signal on line 854 to the time base corrector and this signal is shown in the waveform of FIG. 17(6).

As is apparent from viewing FIGS. 17(4), 17(5) and 17(6), the position of the time base corrector vertical pulse is a function of the addition of the duration of the period of the one-shot 822 that produces the waveform shown in FIG. 17(4) and the duration of the one-shot 826 that produces the waveform shown in FIG. 17(5). It is the upward transition at the completion of the period of one-shot 826 that triggers one-shot 846 and produces the time base corrector vertical signal. Since the timer chips and particularly one-shots 822 and 826 are under program control and the microprocessor has stored in it the history of the activity that occurred in the prior head revolution, i.e., whether a jump occurred and in which direction it occurred, the microprocessor can change the count in the one-shots to provide the proper compensation so as to place the time base corrector vertical pulse in the proper location. Similarly, the one-shots 822 and 830 are differently program controlled by the microprocessor to provide a predicted second equalizer pulse on line 838 which is automatically inserted in the absence of tape equalizing pulses. The computer listings contain the information which accomplishes the compensation in accordance with the history of the prior revolution in terms of the presence or absence of a jump as well as the instantaneous level or position of the head and whether a jump is to occur in the present revolution. If a jump is to occur, then the proper compensation of the time base corrector vertical pulse is made to insure that the picture will be vertically stable during reproducing.

The timer chips 778, 818, 828 and a timer chip 856 are all clocked by a clock line 858 that originates from a voltage controlled oscillator 860 FIG. 14b which is controlled by the output of a digital-to-analog converter 862 which is connected to output lines 864 of a latch 866. Latch 866 is a part of a digital sample and hold circuit that includes an up/down counter 868 whose up/down control line is controlled by output line 870 of a divide by 64 divider 872 and its input is a 64 times the horizontal rate which is the output frequency of the voltage controlled oscillator 860. The counter 868 is clocked by clock line 858.

A ½ line eliminator 874 provides an output on line 876 that is at the horizontal rate and is derived from the off-tape composite sync signal. The horizontal rate signal on line 876 is inverted by inverter 878 and controls the latch 866 so as to write in the error that is present in up/down counter 868 at the latch time. In the event that the off-tape signal is lost, an RF absent signal is applied to line 880 which is operably connected to the counter 868 and latch 866 via two inverters. The effect of an active RF absence signal will cause the counter 868 to indicate zero error which will be transmitted through latch 866 to force zero error onto the output of the digital-to-analog converter 862 so that the voltage controlled oscillator 860 will be free-running at the 64H clock rate.

To determine whether the apparatus has the correct field match during playback, the apparatus compares the reference frame signal on line 882 FIG. 14a with the playback frame signal on line 884, both lines of which provide inputs to an EXCLUSIVE OR gate 886. The playback frame signal originates from the time base corrector vertical and horizontal signals which are applied to a D flip-flop 888. The D input is provided by the horizontal signal from line 870 of the 872 counter FIG. 14a and the time base corrector vertical signal from the output of inverter 850 clocks the D flip-flop and provides the playback frame rate signal on the $\overline{Q}$ output line 884 which is applied to the EXCLUSIVE OR gate 886. When both inputs to the EXCLUSIVE OR gate are high, then its output line 890 is low and, correspondingly, if both inputs are low, the output line is also low. When the inputs have different levels, the EXCLUSIVE OR output level will be high. The output signal on line 890 is sampled by the microprocessor via a tri-state buffer 892 during the mid-portion of the frame period to determine if the playback signal is properly frame matched relative to the reference signal. If the frame match is incorrect, then the microprocessor will command the automatic scan tracking servo to provide a one track head jump and the jump will be in the direction toward the center or nominal undeflected position of the piezo-ceramic bimorph that carries the head. The output line 890 also extends to an integrator 894 which integrates the signal level over a number of fields and provides an analog signal which is utilized by the recorder during edits to assist in proper editing. The microprocessor also averages the value of the output of the EXCLUSIVE OR gate 886 over several consecutive fields for the purpose of insuring that the frame match signal is accurate, and if so, it will command a jump if necessary.

The Reference Clock Generator Circuitry

Figure 12:
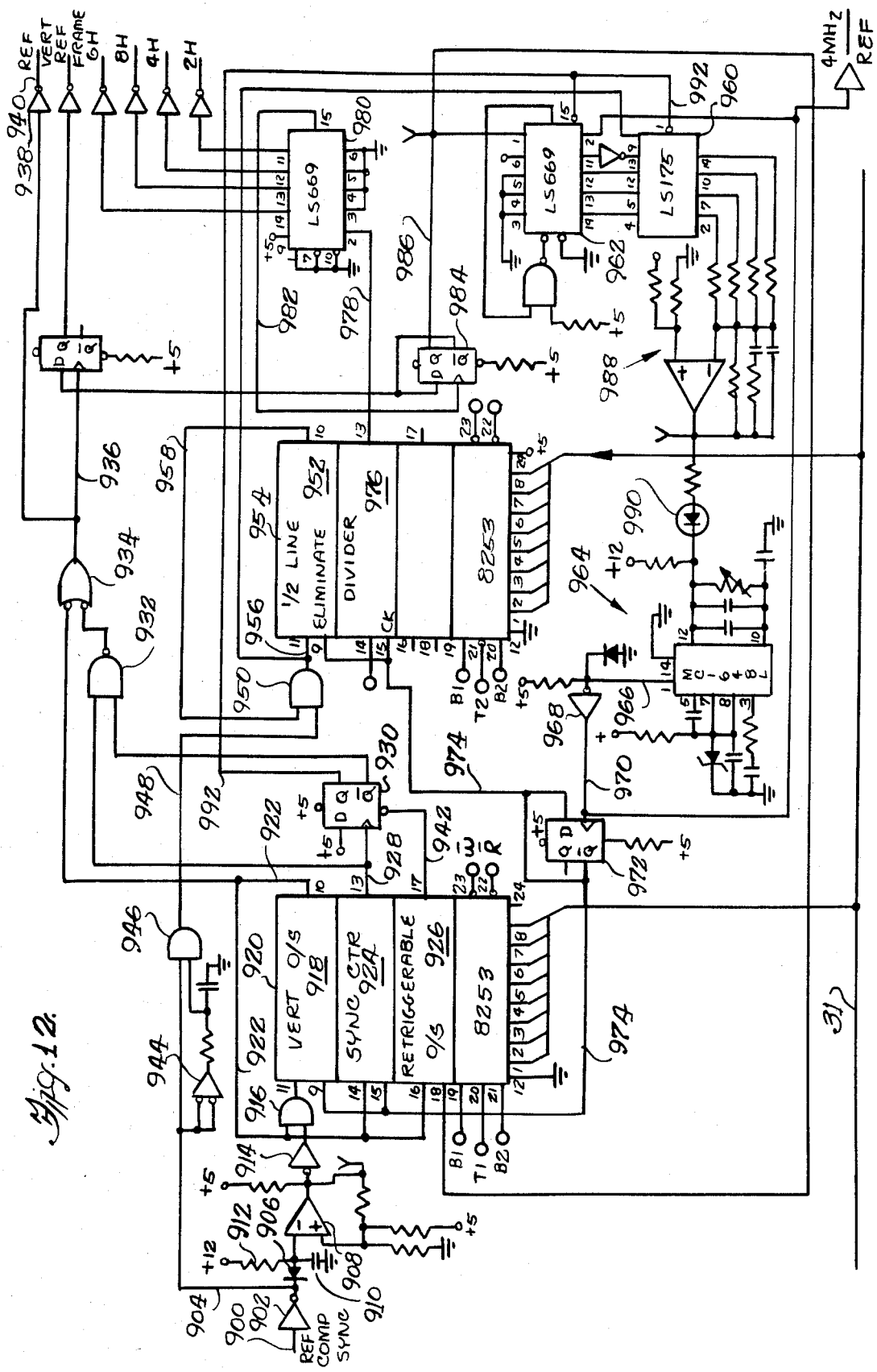
FIG. 12 is a detailed electrical schematic diagram of a reference generator circuitry of the apparatus embodying the present invention.
Figure 13:
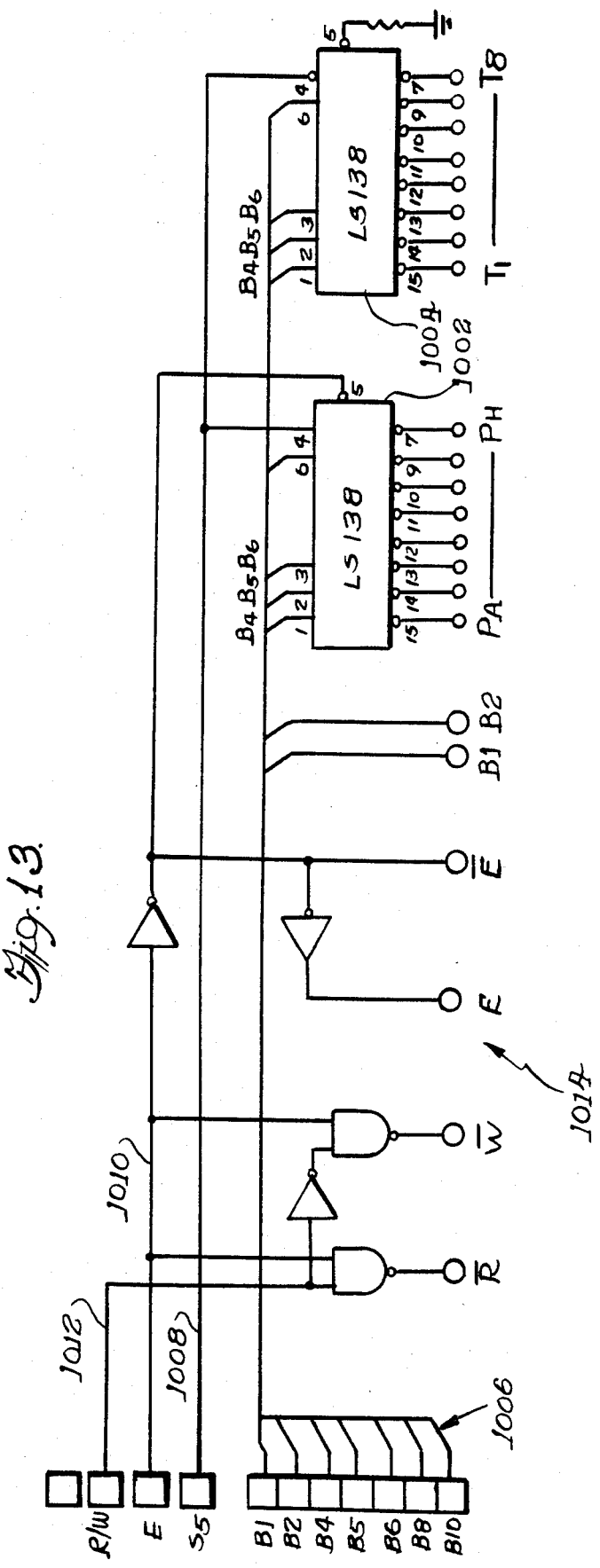
FIG. 13 is a detailed electrical schematic diagram of a board decode circuitry of the apparatus embodying the present invention.

In accordance with another aspect of the present invention, the reference generator shown in FIG. 12 is operable to provide various reference clocks for use in the circuitry of the apparatus and is adapted to operate in two modes, one of which is synchronous with composite station synchronization signals to provide various synchronous reference clock signals, namely frame rate signals, vertical reference synchronization signals and various multiples of the horizontal sync signal. Since the reference generator is synchronized to station composite sync, and provides the clock signals for the entire apparatus, the clock signals are thereby fully synchronized throughout all circuitry of the apparatus described herein. The reference generator is also adapted to operate in a free-wheeling mode in the sense that if composite sync is lost, the various clocks will be produced by the reference generator circuitry in a manner that has the requisite stability to insure proper operation of the apparatus in the absence of composite sync. The reference generator is phase locked to the composite sync under the control of the microprocessor 31 and is thereby adapted to be configured to either a 525 line NTSC format or a 625 horizontal line PAL or SECAM format.

Turning specifically to FIG. 12, reference composite sync is applied to line 900 and is inverted by inverter 902, the output of which appears on line 904 that is connected to the cathode of a diode 906, the anode of which is connected to the negative input of comparator 908 as well as to a capacitor 910 and a source of positive voltage through resistor 912. The comparator 908 effectively separates the horizontal sync pulses from the vertical sync pulses and provides a low output at the appearance of the first broad pulse of the vertical sync sequence. This is inverted by inverter 914 and applied to an AND gate 916 which has its output connected to the input of a one-shot 918 of a programmable timer chip 920 that is reset shortly before the occurrence of the next vertical interval. Thus, the operation of the one-shot is effective to be triggered at the occurrence of the first broad pulse during the vertical synchronization sequence and output line 922 goes low at a vertical rate and the low pulse disables gate 916 so that subsequent broad pulses of the vertical synchronization interval will not trigger the one-shot 918 again. The output is also connected to a synchronized counter 924 and to a retriggerable one-shot 926. The synchronized counter provides a vertical pulse on output 928 which clocks a D flip-flop 930 and via gates 932 and 934 provides a vertical reference signal on line 936 which is inverted by inverter 938 and the inverted signal appears on output line 940.

As long as reference composite sync is present at the input 900, reference vertical will be provided on output line 940 that is synchronized to the reference composite sync as is desired. In the event that reference composite sync is interrupted for some reason, then the retriggerable one-shot 926 will time out. In this regard, it has a time constant that is substantially longer than a normal switching operation that would occur during an edit, for example. If the retriggerable one-shot 926 is not provided with subsequent input pulses via line 922, then it will provide a low signal on output line 942 which will set flip-flop 930 so that the reference vertical on line 940 will be provided by the synchronized counter output 928 rather than the detected vertical pulse output from the one-shot 918. The synchronized counter 924 is programmed from the data bus 31 and is provided with a counter value that is consistent with the period of the vertical sync and the synchronized counter will provide vertical sync pulses on output line 928 by virtue of the internal counter rather than being retriggered by virtue of the detection of the vertical sync component of the reference composite sync.

The reference composite sync on line 900, after undergoing an inversion, is then applied to two gates 944 and 946 which, together with the associated resistor and capacitor, form a very narrow pulse on output line 948 which is applied to one input of AND gate 950, the output of which is applied to a ½ line eliminator counter 952 of a programmable timer chip 954 via line 956. The output of the ½ line eliminator appears on line 958 which is applied to the other input of AND gate 950, and line 956 thereby contains a 1H frequency rate pulse that is essentially the input reference horizontal signal which is applied to the clock input of a latch 960 which effectively latches in the input value applied from an up/down counter 912 at the time the input reference horizontal signal occurs.

A voltage controlled oscillator 964 has an output line 966 which is inverted by inverter 968 and provides a 4 MHz output on line 970 which extends to a divide-by-two circuit 972 as well as to the clock inputs of the up/down counter 962. The divided 2 MHz clock on line 974 is applied to clock the one-shot 918 as well as synchronized counter 924 and is also applied to a counter 976 which operates as a divide-by-four counter and provides a 32H rate signal on output line 978 which in turn is applied to a divider 980 which has various output clock signals, i.e., 16H, 8H, 4H and 2H, as shown. The divider 980 also has a 2H rate output 982 which is applied to a divide-by-two divider 984 which provides a H rate signal on line 986 that clocks the retriggerable one-shot 926 and also controls the up/down control line to the up/down counter 962. The up/down counter together with the latch 960 form a digital sample and hold circuit. The up/down counter 962 is clocked by the 4 MHz clock signal on line 970 and operates to provide a digital representation of the H rate signal, since it is either at the upper or lower level or is changing from one of the levels to the other when the instantaneous value is latched into the latch 960 at the occurrence of the reference horizontal via line 956. The latch 960 has output lines which are applied to a resistor ladder network and an operational amplifier which function as a digital-to-analog converter 988, the output of which is applied to a varicap diode 990 that controls the voltage controlled oscillator 964 to thereby phase synchronize the voltage controlled oscillator to the reference composite sync as is desired.

In the event that the reference composite sync is missing as previously described, then the retriggerable one-shot 926 causes the D flip-flop 930 to provide a low signal on line 992 which is applied to the up/down counter 962 as well as the latch 960. The low signal on line 992 sets the up/down counter 962 to provide zero error and simultaneously causes the latch 960 to be transparent so that zero error is forced from latch 960 which provides zero error to the varicap 990 and enables the voltage controlled oscillator 964 to operate in a free-wheeling manner since there is no reference composite sync upon which the system can be synchronized.

Conclusion

From the foregoing detailed description, it should be appreciated that an improved automatic scan tracking servo has been shown and described which results in the aforementioned objects being satisfied. The servo has many operational advantages, one of which is the significantly improved accuracy and reliability of the apparatus by virtue of the servo operating essentially in the digital domain. The total synchronism of the dither phase, the operation of the synchronous detector and the sampling of the error permits a significantly reduced dither amplitude to be applied to the movable element which results in less degradation of the RF signal being reproduced. By virtue of the ability to accurately locate the digital sampling relative to the dither induced error, and the fact that such sampling is retimed every revolution of the scanning head, insures that the desired synchronism is maintained. Since the servo utilizes tape speed information to predict the slope of the ramp that is required to accurately follow a track during the particular reproducing speed, the error correcting portion of the servo is required to perform a lesser amount of work, which therefore also contributes to the reduced amplitude dither that must be applied to the movable element. The use of digital techniques enables high rate geometric errors to be corrected in a manner that has not been possible with prior art systems.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

What is claimed is:

1. In a magnetic tape recording and/or reproducing apparatus of the type which has a tape guide drum around which tape is wrapped, at least one rotatable transducing head mounted to an element that is movable along a path generally transverse to the longitudinal orientation of tracks of video information recorded on the tape, a servo system for controlling the movement of the element to accurately follow a track during reproducing and to selectively reposition the element to reproduce a desired track subsequently upon completion of the reproducing of a track, said system comprising:

drive means for controlling the movement of the element along said path;

means operatively connected to said drive means for causing the same to impart oscillatory dither movement to the element;

means for receiving a video signal reproduced by the reproducing head and for detecting the amplitude of a component of the reproduced signal related to the oscillatory movement;

a microprocessor; and means for generating interrupt pulses to cause said microprocessor to sample the detected amplitude component at a predetermined number of locations relative to each track and to generate error correcting signals in response to the samples for application to said drive means, said microprocessor controlling the phase of the oscillatory movement causing means to thereby synchronize the sampling and the oscillatory movement to one another.

2. A servo system as defined in claim 1 wherein said microprocessor also controls said detecting means to thereby synchronize the detection of the component with the phase of the oscillatory movement of the element and the sampling locations.

3. A servo system as defined in claim 2 including auxiliary means for adjusting the phase of the oscillatory movement causing means relative to the sampling performed by the microprocessor.

4. A servo system as defined in claim 1 wherein said apparatus includes means for generating a signal at a predetermined location during each revolution of the rotatable head, said interrupt pulse generating means including first counting means for generating a first interrupt pulse a predetermined time period after the occurrence of said head location signal and a second counting means operatively associated with the first counting means for generating subsequent interrupt pulses at times related to the generation of the first interrupt pulse.

5. A servo system as defined in claim 4 wherein said first counting means has a first predetermined count and said second counting means has a second predetermined count, the first predetermined count being smaller that the second predetermined count so that the location of the first interrupt is retimed every revolution of the head.

6. A servo system as defined in claim 5 wherein the video information recorded in each track on the tape includes an active video portion located between first and second vertical blanking pulses and wherein the count of the first counting means is predetermined to permit all samples to be taken along the active video portion of a track of information between the vertical blanking pulses.

7. The servo system of claim 1 wherein said microprocessor samples said component at least 14 times during each track of information.

8. A servo system as defined in claim 1 wherein said drive means includes means for producing clock pulses, an up/down counter means for counting said clock pulsed and producing a digital output indicative of the number of counted pulses, a first digital-to-analog converter means receiving said digital output from said up/down counter and producing an associated analog signal, and amplifier means for controlling the movement of said element, said amplifier means receiving the analog signal from said first digital-to-analog converter and an output signal from said oscillatory movement causing means.

9. A servo system as defined in claim 8 wherein said drive means further includes a second digital-to-analog converting means, said second digital-to-analog means receiving digital error signals that are generated by said microprocessor in response to said samples, and producing an associated analog signal that is applied to said amplifier means.

10. A servo system as defined in claim 9 wherein said clock pulse producing means includes means adapted to receive signals indicative of the longitudinal tape speed and produce said clock pulses in response thereto, said clock pulses selectively incrementing and decrementing said up/down counter means to provide a signal corresponding to a predicted path of movement of the head that is generally independent of the actual error in alignment of the head and the track being reproduced.

11. A servo system as defined in claim 10 including a tachometer associated with an idler located in the tape path of said apparatus, said tachometer providing a signal to said microprocessor, said microprocessor utilizing said tachometer signal to generate said longitudinal tape speed indicating signal.

12. A servo system as defined in claim 10 wherein said servo system further includes a second counter means for producing output signals indicative of the longitudinal tape speed and a third counter means producing a fixed rate output signal, and said clock pulse producing means includes circuit means for measuring the difference between said second and third counter output signals and for controlling said up/down counter means to selectively increment and decrement the same in response to said difference.

13. A servo system as defined in claim 12 further including a fourth counter means for presenting a predetermined number of incrementing or decrementing counts, related to the distance between adjacent tracks on the tape, to said up/down counting means for moving said movable means along the path to reposition the element and transducing head on a desired track subsequently of completion of reproducing of a track.

14. A servo system as defined in claim 13 wherein said second counter means comprises a programmable counter that is programmed by said microprocessor with a number related to said tachometer signal to cause said second counter to produce said output signals at a frequency related to longitudinal tape speed.

15. A servo system as defined in claim 13 wherein said predetermined number of counts causes said movable means to move said head a transverse distance along said path by an amount equal to an integral multiple of the distance between the centers of two adjacent tracks.

16. In a tape recording and reproducing apparatus of the type having a rotatable magnetic head for reproducing information signals recorded on the tape in tracks during rotation thereof, an automatic scan tracking servo system for providing accurate alignment of the head along a track of information being reproduced, comprising:

means for moving the head in a direction transversely of the track;

means for generating an oscillatory dither signal and for applying said signal to said moving means to cause said head to oscillate relative to the track;

a synchronous detector for detecting a component of the signal reproduced by the head;

a microprocessor for sampling the detected component and controlling said moving means in response to the sampled components; and means responsive to the rotation of the head for presenting interrupt pulses to said microprocessor to sample said detected component at predetermined times related to the rotation of the head.

17. The servo system of claim 16 wherein said interrupt pulse presenting means comprises a first counter responsive to rotation of the head for generating one interrupt pulse a first time period after the head passes a predetermined point along its rotational path, and a second counter for generating subsequent pulses at predetermined time periods after said one interrupt pulse.

18. The servo system of claim 17 wherein said predetermined time periods are of longer duration than said first time period.

19. The servo system of claim 16 further including a programmable counter that is programmed by said microprocessor to provide a control signal that synchronizes the phase of the head oscillation and the sampling of said detected component.

20. The servo system of claim 19 wherein said microprocessor also controls said synchronous detector to synchronize the detection of said component with the phase of the head oscillation and said sampling.

21. The servo system of claim 19 wherein said oscillatory signal generating means includes a counter that produces a binary signal, means for generating said oscillatory signal in response to said binary signal; and a logic circuit for modifying the phase of said binary signal in response to said control signal to effect synchronization of said oscillatory movement and the sampling.

22. The servo system of claim 21 wherein said counter of said oscillatory signal generating means is programmable and is controlled by said microprocessor.

23. The servo system of claim 16 further including means responsive to said microprocessor for generating a ramp signal having a slope related to the speed of the tape, and means responsive to said microprocessor for modifying said ramp signal in dependence upon the value of the samples of the detected component, said moving means moving the head in response to the modified ramp signal.

24. The servo system of claim 23 wherein said microprocessor includes digital filtering means for processing said samples to produce an output signal indicative of geometric errors in a track and wherein said output signal is summed with said ramp signal to control said head moving means.

25. The servo system of claim 23 wherein said ramp signal generating means includes a first programmable counter for producing pulses at a frequency determined by said microprocessor and a second counter for counting said pulses to produce an output signal that is determinative of said ramp signal, said second counter being programmable by said microprocessor for modifying said ramp determinative output signal and thereby modifying said ramp signal.

26. The servo system of claim 25 further including means controlled by said microprocessor for providing a predetermined number of pulses to said second counter to thereby produce a discrete jump in said ramp signal in response to the speed of the tape and to the level of said ramp signal.

* * * * *

UNITED STATES PATENT AND TRADEMARK OFFICE
CERTIFICATE OF CORRECTION

PATENT NO. : 4,544,967

DATED : October 1, 1985

INVENTOR(S) : Kenneth Louth

It is certified that error appears in the above-identified patent and that said Letters Patent is hereby corrected as shown below:

Column 25, line 49, "smaller that" should read --smaller than--;
Column 1, line 12, "CAPABILITY, No." should read --CAPABILITY Serial No.--;
Column 1, line 22, "364,352" should read --364,652--;
Column 2, line 8, "et al. No." should read --et al. Serial No.--;
Column 2, line 55, "RP" should read --RF--;
Column 5, line 7, "microprocesor" should read --microprocessor--
Column 6, line 6, " wound off on one" should read --would off of one--;
Column 6, line 24, "in the mode" should read --in that mode--;
Column 6, line 38, "scanner/tachometer occurs" should read --scanner/tachometer pulse occurs--;
Column 6, line 50, " stock registers" should read --stack registers--;
Column 7, lline 10, " 50 through 57" should read --SO through S7;
Column 7, line 64, "ramp cracking error" should read --ramp tracking error--;
Column 8, line 60, "precedingg" should read --preceding--;
Column 9, line 50, "normal" should read --nominal--;
Column 9, line 65, "case, when" should read --case, then--;
Column 10, line 47, "eitht" should read --eight--;
Column 12, line 37, "bandwith" should read --bandwidth--;
Column 13, line 54, "comprehehsively" should read --comprehensively--;
Column 13, line 56, "transducing head relative to" should read --transducing head to be properly aligned with--;
Column 14, line 45, "distributed therealong" should read --distributed differently therealong--;

UNITED STATES PATENT AND TRADEMARK OFFICE
CERTIFICATE OF CORRECTION

PATENT NO. : 4,544,967
DATED : October 1, 1985
INVENTOR(S) : Kenneth Louth

It is certified that error appears in the above-identified patent and that said Letters Patent is hereby corrected as shown below:

```
    Column 15, line 5, "FIG. 12(7)" should read --FIG. 6(7)--;
    Column 15, line 66, "very" should read --vary--;
    Column 17, line 22, "Up/-" should read --Up/---;
    Column 17, line 31, "up/-" should read --up/---;
    Column 17, line 63, "FIGS. 7 and 11aand 11b" should read
--FIGS. 11a and 11b--;
    Column 18, line 16, "up/-" should read --up/---;
    Column 18, line 17, "apropriately" should read
--appropriately--;
    Column 20, line 15, " shown in FIG. 15" should read
--shown in FIG. 15(4)--;
    Column 20, line 18, "FIG. 25(4)" should read --FIG. 15(4)--;
    Column 23, line 46, "up/-" should read --up/---;
    Column 23, line 47, "counter 912" should read --counter
962--;
    Column 24, line 4, "horizonta" should read --horizontal--
```

Signed and Sealed this

Fifteenth Day of April 1986

[SEAL]

Attest:

DONALD J. QUIGG

Attesting Officer    Commissioner of Patents and Trademarks